US012355764B2

(12) United States Patent
Hua et al.

(10) Patent No.: US 12,355,764 B2
(45) Date of Patent: Jul. 8, 2025

(54) METHOD, APPARATUS AND DEVICE FOR GENERATING DEVICE FINGERPRINT AND STORAGE MEDIUM

(71) Applicant: Tencent Technology (Shenzhen) Company Limited, Shenzhen (CN)

(72) Inventors: Huiyou Hua, Shenzhen (CN); Wei Yuan, Shenzhen (CN); Chao Li, Shenzhen (CN); Xiang Wang, Shenzhen (CN); Xiaoxiang Lu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 314 days.

(21) Appl. No.: 17/846,360

(22) Filed: Jun. 22, 2022

(65) Prior Publication Data

US 2022/0329591 A1    Oct. 13, 2022

Related U.S. Application Data

(63) Continuation of application No. PCT/CN2021/093473, filed on May 13, 2021.

(30) Foreign Application Priority Data

Jun. 22, 2020   (CN) .......................... 202010570908.1

(51) Int. Cl.
    *H04L 9/40*   (2022.01)
(52) U.S. Cl.
    CPC ...... *H04L 63/0876* (2013.01); *H04L 63/0227* (2013.01); *H04L 63/0815* (2013.01); *H04L 63/101* (2013.01)
(58) Field of Classification Search
    CPC ............. H04L 63/0876; H04L 63/0227; H04L 63/101; H04L 61/3015; H04L 61/3005; H04L 63/0807; H04L 63/0815
    See application file for complete search history.

(56) References Cited

U.S. PATENT DOCUMENTS 9,165,124 B1    10/2015   Gurevich et al.
10,830,863 B1 *   11/2020   Shemesh ............... G01S 5/0278
(Continued)

FOREIGN PATENT DOCUMENTS

CN    103164698 A    6/2013
CN    103166917 A    6/2013
(Continued)

OTHER PUBLICATIONS

International Search Report and Written Opinion with English Translation for International Patent Application No. PCT/CN2021/093473 dated August 12, 2021, 14 pgs.

(Continued)

*Primary Examiner* — Ramy M Osman
(74) *Attorney, Agent, or Firm* — Crowell & Moring LLP

(57) ABSTRACT

Embodiments of this application disclose a method for generating a device fingerprint and a relevant apparatus. The method includes: obtaining a plurality of device features of a target device; obtaining, based on the plurality of device features, a target device feature group of the target device by combining different device features of the target device; querying an inventoried device fingerprint library to retrieve candidate device features of at least one candidate inventoried device mapped to the target device feature group; identifying a device similarity, to obtain a similarity between the target device and the at least one candidate inventoried device; and in response to the similarity between the target device and the at least one candidate inventoried device being greater than a similarity threshold, using a device fingerprint of the at least one candidate inventoried device as a device fingerprint of the target device.

18 Claims, 11 Drawing Sheets

(56) References Cited

U.S. PATENT DOCUMENTS

| | | | | |
|---|---|---|---|---|
| 10,976,404 | B2* | 4/2021 | Wirola | G01S 5/02527 |
| 11,539,697 | B1* | 12/2022 | Senecal | H04L 63/0876 |
| 11,539,742 | B2* | 12/2022 | Hebert | H04L 63/1416 |
| 2011/0288940 | A1 | 11/2011 | Horadan et al. | |
| 2014/0068738 | A1* | 3/2014 | Harty | G06F 21/44 |
| | | | | 726/7 |
| 2015/0046989 | A1* | 2/2015 | Oberheide | H04L 63/0876 |
| | | | | 726/6 |
| 2015/0237039 | A1* | 8/2015 | Grajek | H04L 63/0838 |
| | | | | 726/8 |
| 2016/0142859 | A1* | 5/2016 | Molinet | H04L 67/63 |
| | | | | 709/203 |
| 2016/0226872 | A1* | 8/2016 | Oberheide | H04L 63/0876 |
| 2016/0234211 | A1* | 8/2016 | Gu | H04L 63/102 |
| 2017/0289139 | A1* | 10/2017 | Guo | H04L 9/40 |
| 2017/0317905 | A1* | 11/2017 | Schimmelpfeng | |
| | | | | H04L 43/0817 |
| 2018/0188932 | A1* | 7/2018 | So | H04L 63/083 |
| 2019/0384956 | A1* | 12/2019 | Whelan, III | G06F 21/32 |
| 2022/0329591 | A1* | 10/2022 | Hua | H04L 63/0227 |
| 2023/0252118 | A1* | 8/2023 | Gookin | G06V 40/12 |
| | | | | 713/186 |

FOREIGN PATENT DOCUMENTS

| | | |
|---|---|---|
| CN | 107423613 A | 12/2017 |
| CN | 107516038 A | 12/2017 |
| CN | 111478986 A | 7/2020 |

OTHER PUBLICATIONS

Office Action for Chinese Patent Application No. 202010570908.1 dated Aug. 11, 2020, 6 pgs.

* cited by examiner

METHOD, APPARATUS AND DEVICE FOR GENERATING DEVICE FINGERPRINT AND STORAGE MEDIUM

RELATED APPLICATION

This application is a continuation application of PCT Patent Application No. PCT/CN2021/093473, filed on May 13, 2021, which claims priority to Chinese Patent Application No. 202010570908.1, filed with the China National Intellectual Property Administration on Jun. 22, 2020, each of which is incorporated herein by reference in its entirety.

FIELD OF THE TECHNOLOGY

This application relates to the technical field of Internet information security, in particular, to generation of a device fingerprint.

BACKGROUND OF THE DISCLOSURE

With the development and popularization of mobile Internet application technology, a device fingerprint, which serves as an identifier that uniquely identifies a device, is widely used in various industrial sectors that involve Internet information security. For example, in the Internet risk control industry, a unique identity of a user needs to be verified based on the device fingerprint. Information is accessible to the user whose unique identity is verified, so as to ensure security of Internet information exchange.

SUMMARY

To ensure uniqueness of a device fingerprint, embodiments of this disclosure provide a method, apparatus, and device for generating a device fingerprint, and a non-transitory computer-readable storage medium, so as to generate a highly unique device fingerprint to enhance security of Internet information exchange.

According to an aspect, an embodiment of this application provides a method for generating a device fingerprint, including: obtaining a plurality of device features of a target device;
determining, based on the plurality of device features, device feature groups corresponding to the target device, the device feature groups of the target device being obtained by combining different device features of the target device;
querying an inventoried device fingerprint library to find device features of at least one to-be-determined inventoried device correlated with each device feature group of the target device, the inventoried device fingerprint library including an index relationship between each device feature group of an inventoried device and device features of the inventoried device;
performing an identification operation on a device similarity based on the device features of the target device and the device features of the to-be-determined inventoried device to obtain a similarity between the target device and the to-be-determined inventoried device; and
determining that a to-be-determined inventoried device with a similarity greater than a similarity threshold is a target inventoried device, and using a device fingerprint of the target inventoried device as a device fingerprint of the target device.

According to another aspect, an embodiment of this application provides an apparatus for generating a device fingerprint, including:
a device feature obtaining module, configured to obtain a plurality of device features of a target device;
a device feature group module, configured to determine, based on the plurality of device features, device feature groups corresponding to the target device, the device feature groups of the target device being obtained by combining different device features of the target device;
an inventory information obtaining module, configured to query an inventoried device fingerprint library to find device features of at least one to-be-determined inventoried device correlated with each device feature group of the target device, the inventoried device fingerprint library including an index relationship between each device feature group of an inventoried device and device features of the inventoried device;
a similarity calculation module, configured to perform an identification operation on a device similarity based on the device features of the target device and the device features of the to-be-determined inventoried device to obtain a similarity between the target device and the to-be-determined inventoried device; and
a device fingerprint obtaining module, configured to determine that a to-be-determined inventoried device with a similarity greater than a similarity threshold is a target inventoried device, and use a device fingerprint of the target inventoried device as a device fingerprint of the target device.

According to another aspect, an embodiment of this application provides a computer device, including a processor, a communication interface, a memory, and a communication bus.

The processor, the communication interface, and the memory communicate with each other through the communication bus. The communication interface is an interface of a communication module.

The memory is configured to store program code and transmit the program code to the processor. The processor is configured to invoke an instruction of the program code in the memory to perform the method for generating a device fingerprint according to any one of the foregoing aspects.

According to another aspect, an embodiment of this application provides a non-transitory computer-readable storage medium on which a computer program is stored. The computer program is used to perform the method for generating a device fingerprint according to any one of the foregoing aspects.

According to another aspect, an embodiment of this application provides a computer program product including an instruction. When run on a computer, the computer program product causes the computer to perform the method for generating a device fingerprint according to any one of the foregoing aspects.

In the foregoing technical solutions, the device features of the target device are combined to obtain device feature groups. The inventoried device fingerprint library is queried to find the device features of the at least one to-be-determined inventoried device correlated with each device feature group. The similarity between the target device and the to-be-determined inventoried device is obtained based on the device features of the target device and the device features of the to-be-determined inventoried device. It is determined that a to-be-determined inventoried device with a similarity greater than the similarity threshold is the target inventoried device. The device fingerprint of the target inventoried device is used as the device fingerprint of the target device. Because the device features vary between devices, the device feature groups obtained by combining the device features also vary. Therefore, the device fingerprint of the target device can reflect device information of the target device in an information dimension corresponding to the device feature groups. In addition, the device information in each dimension is independent, thereby greatly increasing uniqueness of the device fingerprint.

Understandably, the above overall description and the subsequent detailed description are merely exemplary and explanatory without limiting this application.

BRIEF DESCRIPTION OF THE DRAWINGS

The drawings described here are incorporated into the specification as a part of the specification. The drawings illustrate embodiments of this disclosure and are used together with the specification to interpret the principles of this application. Evidently, the drawings outlined below are merely a part of embodiments of this disclosure. A person of ordinary skill in the art may derive other drawings from the outlined drawings without making any creative effort. In the drawings.

DESCRIPTION OF EMBODIMENTS

Figure 1:
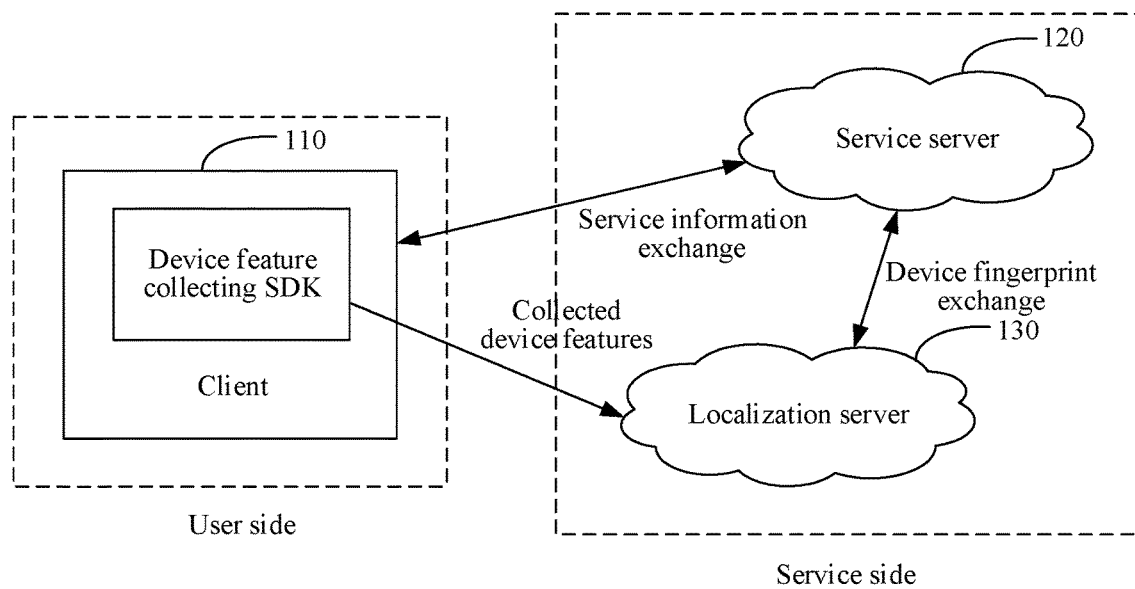
FIG. 1 is a schematic diagram of an example implementation environment according to this application.

Exemplary embodiments are described in detail below, and examples of the embodiments are illustrated in the drawings. Unless otherwise specified, the same reference numerals in different drawings represent the same or similar elements in a case that a drawing is mentioned in the following description. The implementations described in the exemplary embodiments below are not intended to represent all implementations according to this application. Instead, they are merely examples of the apparatus and method according to some aspects of this application as recited in the appended claims.

Referring to FIG. 1, FIG. 1 is a schematic diagram of an implementation environment according to this application.

The implementation environment shown in FIG. 1 is specifically a service system. The service system includes a user side and a service side. The user side specifically includes a plurality of clients 110 (only 1 client is shown in FIG. 1). Each client 110 communicates with the service side in a wired or wireless mode. The service side specifically includes a service server 120 and a localization server 130. The service server 120 and the localization server 130 are deployed in the same network environment, for example, both deployed in a service-side equipment room.

The service server 120 is configured to provide services for the client 110, and, based on service information exchange between the client 110 and the service server 120, implement service functions provided by the client 110. The client 110 runs a device feature collecting software development kit (SDK). The device feature collecting SDK is used for collecting device features of a device on which the client 110 resides, and sending the collected device features to the localization server 130. The location server 130 permutes and combines device features collected by the device feature collecting SDK to obtain a plurality of device feature groups, and then queries an inventoried device fingerprint library to find information about an inventoried device correlated with each device feature group. Based on device features of the device on which the client 110 resides and found device features of each inventoried device, the localization server calculates similarity between a device on which the client 110 resides and each inventoried device. The localization server uses a device fingerprint of an inventoried device with a similarity greater than a similarity threshold as a device fingerprint of the device on which the client 110 resides. The service server 120 obtains, from the localization server 130, the device fingerprint of the device on which the client 110 resides, so as to provide services for the client 110 based on the device fingerprint.

The device on which the client 110 resides may be, but is not limited to, a smartphone, a tablet computer, a notebook computer, a desktop computer, a smart speaker, a smart watch, or the like. The service server 120 and the localization server 130 may be various servers, specifically, may be a stand-alone physical server, or a server cluster or distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform, without being limited herein.

Figure 2:
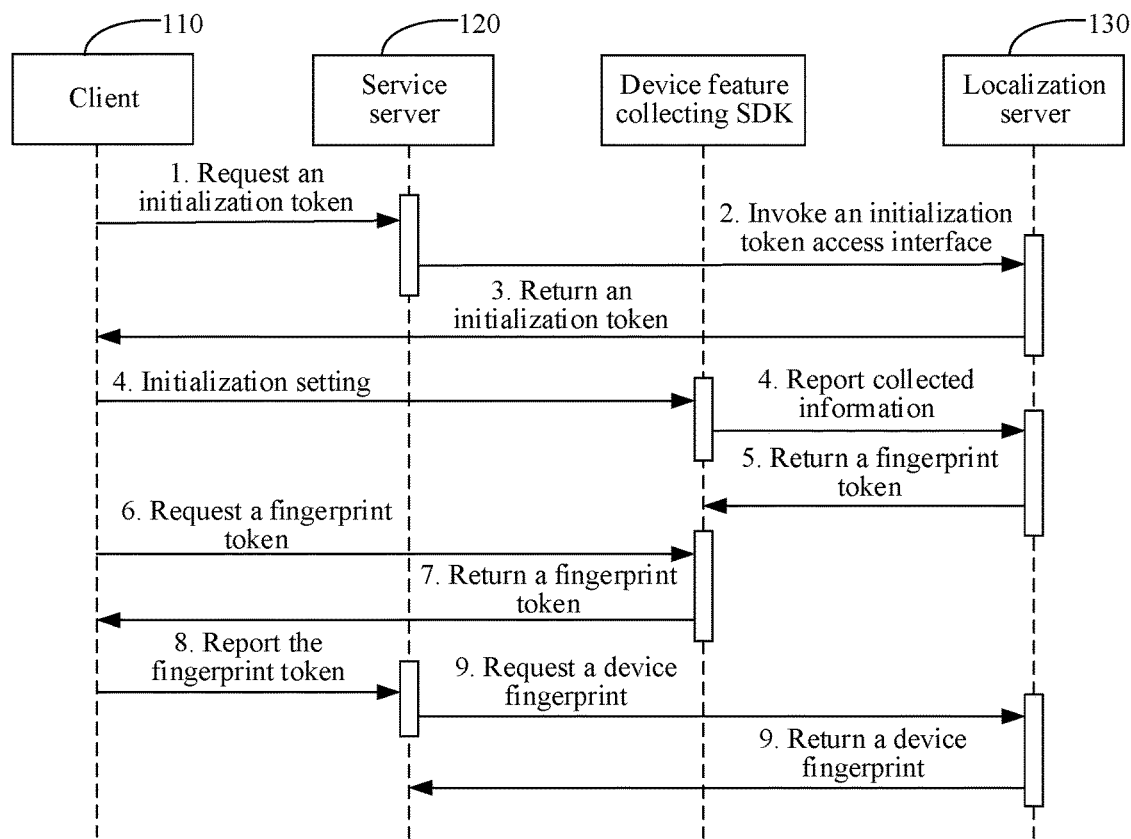
FIG. 2 is a schematic diagram of an interaction sequence corresponding to the example implementation environment shown in FIG. 1.

FIG. 2 is a schematic diagram of an interaction sequence corresponding to the implementation environment shown in FIG. 1.

As shown in FIG. 2, first, a client 110 deployed on a device needs to send an initialization token request to a service server 120 to request an initialization token from the service server 120. The initialization token is used for initializing a device feature collecting SDK. The initialization token is a token used for verifying a login identity and status of login to a client 110, and, once obtained by the client 110, authorizes the service server 120 to initialize the device feature collecting SDK.

After receiving the initialization token request sent by the client 110, the service server 120 verifies a user identity for login to the client 110 based on client information carried in the initialization token request. The client information may be, for example, information such as a user account used for logging in to the client 110 and login status of the user account. If the user identity for login to client 110 is verified as trusted, the service server 120 invokes an initialization token access interface of a localization server 130, for example, invokes an "RPGet Token" interface. Therefore, in response to the request for invoking the initialization token access interface, the local server 130 returns an initialization token to the service server 120. The service server 120 sends the received initialization token to the client 110.

Based on the received initialization token, the client 110 may initialize the device feature collecting SDK. Upon completion of the initialization, the client automatically collects device features of a device on which the client 110 resides, for example, collects some user-permitted device features, and reports the collected device features to the localization server 130.

Based on the device features reported by the device feature collecting SDK, the localization server 130 generates a device fingerprint of the device on which the client 110 resides, allocates a fingerprint token to the generated device fingerprint to correlate the fingerprint token with the device fingerprint, and in turn, returns the fingerprint token to the device feature collecting SDK. Understandably, security of a service system is reduced if a device in the service system uses the same device fingerprint for a long period. In addition, the device may be updated, for example, due to iterative development. If the device uses a single device fingerprint for a long period, capabilities of the device fingerprint to identify the device will decline, and the security of the service system will decline. Therefore, the device fingerprint needs to be updated or refreshed regularly. For example, the localization server 130 updates device fingerprints of all devices in the service system at intervals of 1 day. The localization server 130 allocates a fingerprint token to each device fingerprint generated. Through the fingerprint token, a unique valid device fingerprint can be found by querying.

When the client 110 sends a fingerprint token request to the device feature collecting SDK, the device feature collecting SDK returns the received fingerprint token to the client 110 in response to the fingerprint token request. The client 110 reports the received fingerprint token to the service server 120. Then the service server 120 sends a device fingerprint request to the localization server 130 based on the fingerprint token. The device fingerprint request carries the fingerprint token. Therefore, the localization server 130 correspondingly obtains a device fingerprint correlated with the fingerprint token, and returns, to the service server 120, the device fingerprint correlated with the fingerprint token.

Therefore, the device fingerprint obtained by the service server 120 from the localization server 130 (by using the fingerprint toke), is the device fingerprint of the device on which the client 110 resides. Based on the device fingerprint, the service server 120 can exchange information with the client 110 securely.

For a detailed process for the localization server 130 to generate, based on the device features, the device fingerprint of the device on which the client 110 resides, where the device features are reported by the device feature collecting SDK deployed in the client 110, refer to subsequent embodiments. The details are omitted here.

First, in this embodiment of this application, an inventoried device fingerprint library, a feature group list, and a feature value blacklist library are created beforehand. In this way, corresponding information can be obtained from the created inventoried device fingerprint library, the feature group list, and the feature value blacklist library in a process of generating a device fingerprint. Therefore, the process of creating the inventoried device fingerprint library, the feature group list, and the feature value blacklist library may be referred to as an offline stage, and the process of generating the device fingerprint may be referred to as a real-time stage.

Specifically, the inventoried device fingerprint library includes device features and device fingerprints that correspond to a large number of inventoried devices respectively, includes a plurality of device feature groups obtained by permuting and combining the device features of each inventoried device, and includes a mapping (or index) relationship between each device feature group and the inventoried device. Each inventoried device may be associated with at least one device feature group. The device fingerprint of a inventoried device can be found in the inventoried device fingerprint library based on any device feature group of the inventoried device.

An inventoried device is associated with device features collected in the offline stage. The number of inventoried devices is usually large. The device fingerprint of the inventoried device is generated based on a plurality of device feature groups (each feature group is formed by various device features via permutation and combination) corresponding to the inventoried device. In addition, in this embodiment of this application, "a plurality of" specifically means at least two.

Each inventoried device may be associated with multiple feature groups. A feature group list includes the device feature groups corresponding to each inventoried device. In the real-time stage, based on the feature group list, several individual device features may be combined, that is, several individual device features may be permuted, so as to obtain a plurality of device feature groups.

The feature value blacklist library includes several invalid device features. If the recurrence rate of a device feature is lower, the device feature is easier to distinguish, a device fingerprint generated based on the device feature is easier to distinguish, the uniqueness of the device fingerprint is higher, and the device feature is more valid. The invalidity of the device features is termed relative to the validity. Therefore, the validity of the device feature can be determined based on the recurrence rate of the device feature.

Figure 3:
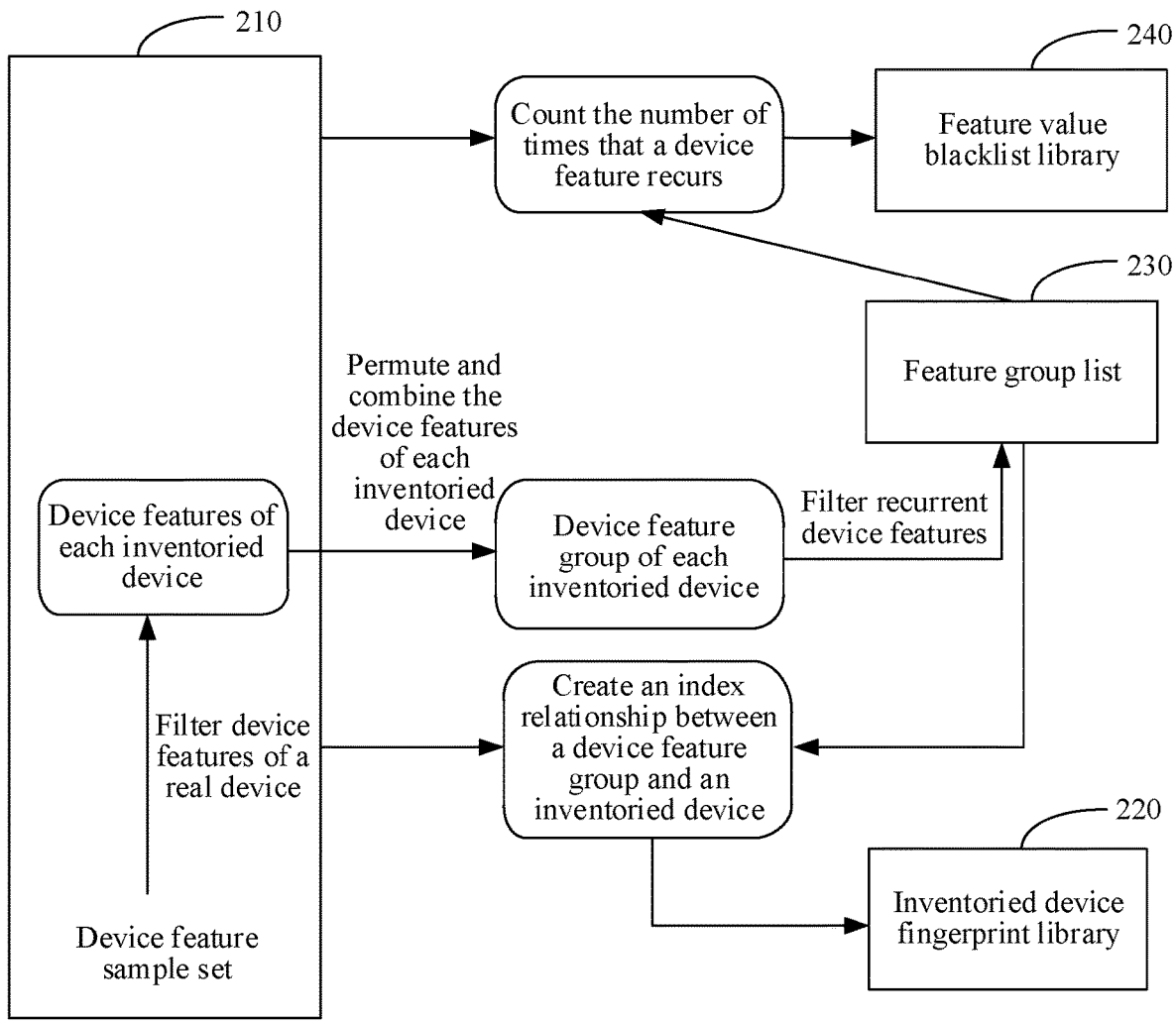
FIG. 3 is a flowchart of creating an inventoried device fingerprint library, a feature group list, and a feature value blacklist library according to an exemplary embodiment.

FIG. 3 is a flowchart of creating an inventoried device fingerprint library 220, a feature group list 230, and a feature value blacklist library 240 according to an exemplary embodiment.

As shown in FIG. 3, first, device features of several devices need to be collected to obtain a device feature sample set 210. Several devices mean a large amount of user equipment. The device features of the devices include relevant information used for characterizing hardware and/or software of the devices, such as International Mobile Equipment Identity (IMEI), central processing unit identifier (CPU ID), International Mobile Subscriber Identity (IMSI), Internet Protocol (IP) address, which are not enumerated exhaustively here.

The device features are collected from the devices, for example, by a device feature collecting SDK (or other feature collection application) that runs in a device. Some devices may be disguised devices (or virtual devices), such as simulator devices and virtual machine devices. The disguised devices are not unique, and are not suitable for being treated as inventoried devices. Therefore, real devices need to be identified from the device feature sample set 210 as inventoried devices, and the device features of the real devices are used as the device features of the inventoried devices.

The device features of each inventoried device are permuted and combined to obtain a plurality of device feature groups corresponding to the inventoried device. Then the device fingerprint of each inventoried device is calculated based on the device feature groups corresponding to the inventoried device. In this way, the inventoried device fingerprint library 220 is created based on the device fingerprint and device features of each inventoried device, and a plurality of device feature groups corresponding to each inventoried device. For example, as can be seen from the inventoried device fingerprint library 220 shown in FIG. 4, the inventoried device fingerprint library 220 includes an index relationship between each device feature group and the information about the inventoried device. The device features and device fingerprint of a corresponding inventoried device can be found by querying based on any device feature group. As an example, the permutation and combination performed on the device features may be combining any two or more device features into one device feature group. The specific combination method of device features is not limited herein.

Specifically, for one of the inventoried devices, a recurrence rate of each device feature group of the inventoried device recurring in device feature groups of all inventoried devices is determined. Then a device feature group with a recurrence rate lower than a recurrence rate threshold is determined. A device fingerprint of the inventoried device is calculated based on the device feature group with a recurrence rate lower than the recurrence rate threshold. The recurrence rate threshold may be predetermined or may be configured on the fly. In this way, an index or mapping relationship between each device feature group and the inventoried device can be formed and added into the inventoried device fingerprint library 220. In contrast to the practice in which the device fingerprint is generated directly based on the device features, this embodiment generates the device fingerprint based on the device feature group, thereby increasing complexity of the device fingerprint. Therefore, it is easier to distinguish the device fingerprint between different inventoried devices, and the uniqueness of the device fingerprint of an inventoried device is higher. In one example implementation, assuming there are 10000 inventoried devices, and device feature group 1 is associated with 3 out of all the inventoried devices, then the recurrence rate of device feature group 1 is 0.0003. If device feature group 2 is associated with 9 out of all the inventoried devices, then the recurrence rate of device feature group 2 is 0.0009.

Figure 4:
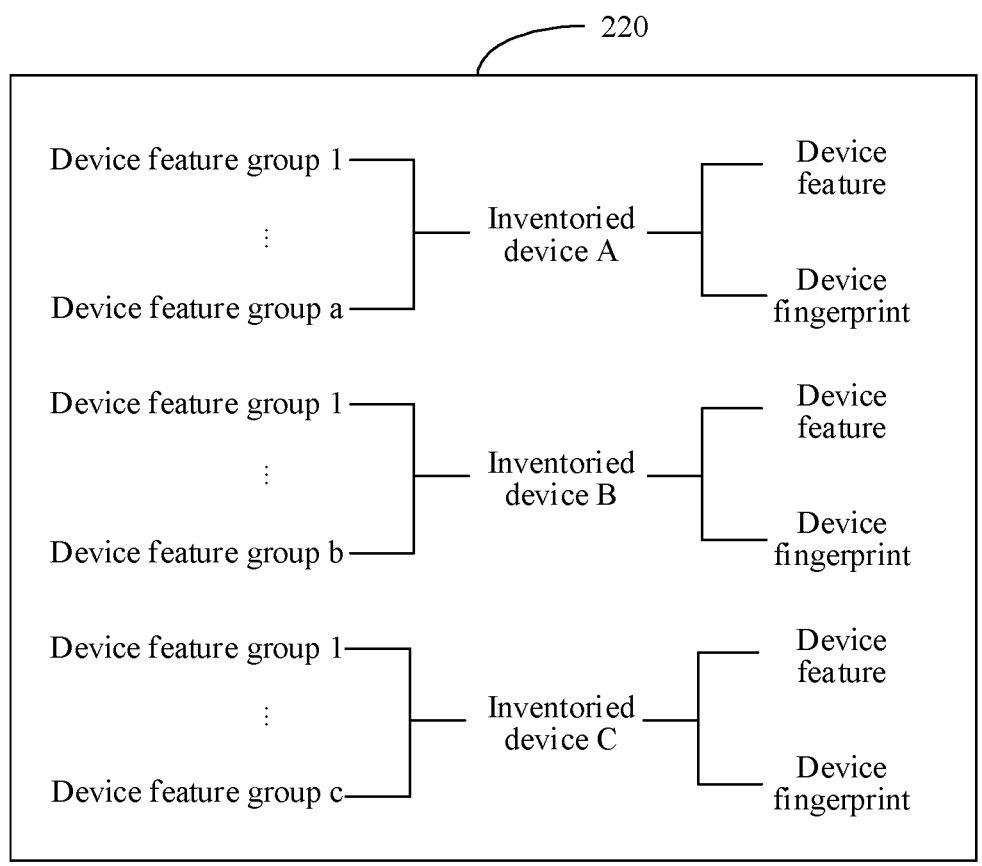
FIG. 4 is a schematic diagram of an inventoried device fingerprint library according to an exemplary embodiment.

For example, a hash value may be calculated for each identified device feature group with a recurrence rate lower than the recurrence rate threshold (for example, 0.05). Consequently, all hash values are concatenated to obtain a device fingerprint of the inventoried device. As shown in FIG. 4, the inventoried device A corresponds to a device feature group 1 to a device feature group a. The hash values calculated for the device feature groups are hash value 1 to hash value a correspondingly. The device fingerprint of the inventoried device A may be expressed as any combination of the hash values concatenated. The means of performing the hash operation on each device feature group may be specifically Murmurhash 3 (a version of the Murmur hash function) or other hash function versions, without being limited herein. Device fingerprints of the inventoried device B and the inventoried device C may also be generated in the way above, details of which are omitted herein.

The relevant index information of each inventoried device is added into the inventoried device fingerprint library 220 to obtain the inventoried device fingerprint library 220. In this way, the device feature group used for calculating the device fingerprint of the inventoried device is highly distinguishable, and ensures that the device fingerprints of inventoried devices included in the inventoried device fingerprint library 220 are highly unique.

Still referring to FIG. 3, further, in this embodiment, a feature group list 230 is created based on all device feature groups with a recurrence rate lower than the recurrence rate threshold. Specifically, each device feature group with a recurrence rate lower than the recurrence rate threshold is added into the feature group list 230, so that the feature group list 230 not only includes all device feature groups, but also includes all device features that constitute each device feature group.

In this embodiment, the number of times that each device feature included in the feature group list 230 recurs in the device feature sample set 210 is counted. A feature value blacklist library 240 is created based on all device features that recur for a number of times greater than a preset count threshold (such as 1000). In addition, the feature value blacklist library 240 may be supplemented by the device features such as IMEI and IMSI of mainstream device manufacturers. Evidently, the device features included in the feature value blacklist library 240 are of very low distinguishability. The device fingerprints generated based on such device features are of very low uniqueness.

In the real-time stage of generating a device fingerprint, the corresponding information used for generating the device fingerprint can be obtained from the inventoried device fingerprint library 220, the feature group list 230, and the feature value blacklist library 240 created in this embodiment. For the specific obtaining method, refer to subsequent embodiments, and the details are omitted here.

Figure 5:
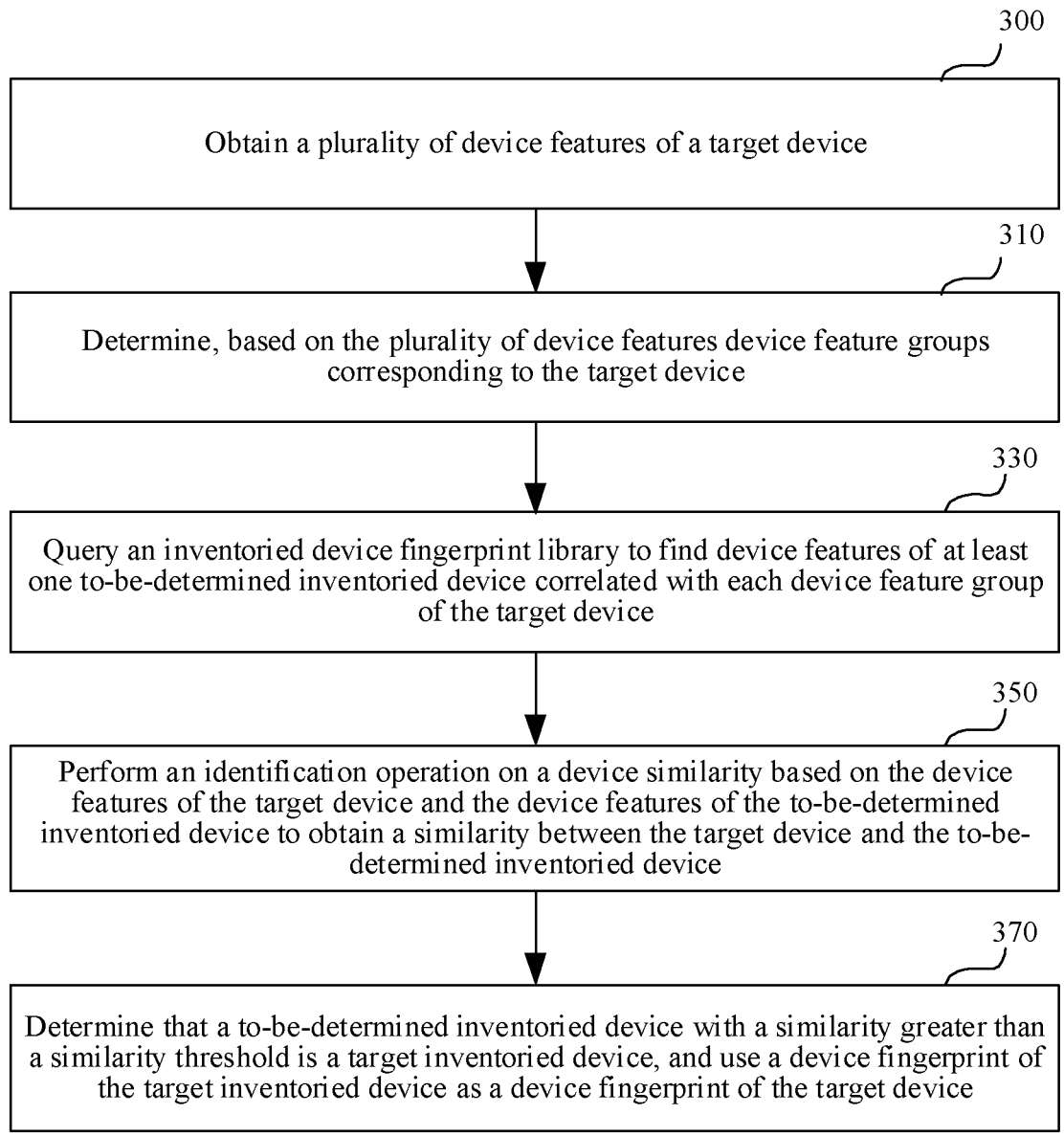
FIG. 5 is a flowchart of a method for generating a device fingerprint according to an exemplary embodiment.

FIG. 5 is a flowchart of a method for generating a device fingerprint according to another exemplary embodiment. This method is applicable to the service system shown in FIG. 1, and is specifically executed by a server serving as a localization server 130 in the system. In this way, based on device features sent by a device feature collecting SDK that is run on a client 110, the localization server 130 generates a device fingerprint of a device on which the client 110 resides.

As shown in FIG. 5, in an exemplary embodiment, the method includes at least the following steps:

Step 300: Obtain a plurality of device features of a target device.

First, the target device means a device for which a device fingerprint needs to be generated. The device features of the target device include relevant information that characterizes hardware and/or software of the target device, for example, information such as IMEI, CPU ID, and IMSI, without being limited herein.

A client is installed in the target device. A device feature collecting SDK runs on the client, so as to automatically collect the device features of the target device by using the device feature collecting SDK. In some other embodiments, the device features of the target device may be obtained in other ways. For example, the device features of the target device are queried in the target device first. Each found device feature is stored in a list file. Therefore, the corresponding device features can be read in the list file. The method for obtaining the device features is not limited herein.

Step 310: Determine, based on the plurality of device features, device feature groups corresponding to the target device.

A single device feature is prone to recur frequently, and therefore, is of low uniqueness, thereby being not conducive to generating a device fingerprint of high uniqueness. This problem can be solved by a device feature group obtained by combining a plurality of device features. In addition, the device fingerprint of an inventoried device included in the inventoried device fingerprint library is also created based on the device feature group corresponding to the inventoried device. In this way, the device fingerprint of the inventoried device is of high uniqueness. Therefore, in this embodiment, it is necessary to combine the device features of the target device to obtain device feature groups corresponding to the target device.

In an embodiment, a duplicate suppression operation performed on the device features of the target device may be specifically: combining any number of device features, for example, combining any two or three device features into one device feature group, thereby obtaining a plurality of device feature groups corresponding to the target device.

Alternatively, in other embodiments, the feature group list created beforehand in the foregoing embodiment includes the device feature groups corresponding to a large number of inventoried devices. In this embodiment, the feature group list can be queried to find a target feature group formed by any number of device features of the target device. The at least one target feature group that is found is a device feature group corresponding to the target device. Understandably, in this embodiment, "a plurality of" specifically means at least two.

Therefore, in this embodiment, the device feature group corresponding to the target device is obtained, and then the device fingerprint of the target device is created based on the device feature group. The device feature group recurs less frequently than each individual device feature. Therefore, the device fingerprint created based on the device feature group is easier to distinguish, so that the device fingerprint is of higher uniqueness, and the information exchanged by using the device fingerprint is securer.

Step 330: Query an inventoried device fingerprint library to find device features of at least one to-be-determined inventoried device correlated with each device feature group of the target device. The inventoried device fingerprint library includes an index relationship between each device feature group and device features of an inventoried device.

As mentioned in the preceding embodiment, an inventoried device fingerprint library is created based on device features of a large number of inventoried devices. In addition, the inventoried device fingerprint library includes an index relationship between each device feature group and information about the inventoried device. As shown in FIG. 4, the device features and the device fingerprint of an inventoried device can be found by querying the inventoried device fingerprint library based on the device feature group. For example, using device feature group a as the key for the query, inventoried device A may be found, as well as device features and device fingerprint associated with inventoried device A.

Therefore, the device features and the device fingerprint of the inventoried device correlated with the device feature group can be found by querying the inventoried device fingerprint library based on the index relationship (or mapping relationship) included in the inventoried device fingerprint library, that is, based on the device feature group of the target device. The correlation between the device feature group and the information about the inventoried device (such as the device features and the device fingerprint of the inventoried device) means an index relationship between the device feature group and the information about the inventoried device.

For different inventoried devices, some pre-collected device features of the inventoried device may be the same. Consequently, different inventoried devices may include the same device feature group. Therefore, there may be a plurality of to-be-determined (or candidate) inventoried devices correlated with the device feature group of the target device in the inventoried device fingerprint library. In other words, there may be a plurality of to-be-determined inventoried devices correlated with one device feature group of the target device.

In this embodiment, the information about the to-be-determined inventoried device is found by querying the inventoried device fingerprint library. Based on the information, the to-be-determined inventoried device correlated with the target device can be obtained. Consequently, the target inventoried device (within candidate inventoried devices) that is highly similar to the target device is identified based on the similarity between the target device and the to-be-determined inventoried device. In this way, the device fingerprint of the target device is created based on the device fingerprint of the target inventoried device. The device fingerprint of the inventoried device is also created based on each device feature group corresponding to the inventoried device, and is of high uniqueness. Therefore, the device fingerprint of the target device is also of high uniqueness.

Step 350: Perform an identification operation on a device similarity based on the device features of the target device and the device features of the to-be-determined inventoried device to obtain a similarity between the target device and the to-be-determined inventoried device.

The similarity between the target device and the to-be-determined inventoried device is used for characterizing a possibility that the target device is (identical or similar to) the to-be-determined inventoried device. The similarity between the target device and the to-be-determined inventoried device is obtained and identified based on the device features of the target device and the device features of the to-be-determined inventoried device.

For example, the similarity between the target device and the to-be-determined inventoried device may be identified and measured by equivalent matching. For example, different device features may be classed into different feature types such as IMEI feature type, CPU ID feature type, and IMSI feature type. If the device feature is the same between the target device and the to-be-determined inventoried device under the same feature type, it is determined that the similarity between the target device and the to-be-determined inventoried device under this feature type is 1; or, if the device feature is not the same, it is determined that the similarity is 0. Finally, the similarity between the target device and the to-be-determined inventoried device is calculated based on the similarity under all feature types.

In another embodiment, the similarity between the target device and the to-be-determined inventoried device may be identified by other similarity measurement methods. For example, if IP addresses of the target device and the to-be-determined inventoried device belong to the same area or same sub-domain, it is considered that the target device is similar to the to-be-determined inventoried device, and the similarity is assigned a preset value. The similarity measurement method is not limited herein.

Step 370: Determine that a to-be-determined inventoried device (i.e., a candidate inventoried device) with a similarity greater than a similarity threshold is a target inventoried device, and use a device fingerprint of the target inventoried device as a device fingerprint of the target device.

As mentioned above, by calculating the similarity between the target device and the to-be-determined inventoried device, the possibility or probability that the to-be-determined inventoried device is the target device can be obtained. A to-be-determined inventoried device with a similarity greater than a similarity threshold is likely to be the target device. In addition, the preset similarity threshold may vary depending on the similarity measurement method.

In this embodiment, the device fingerprint of the to-be-determined inventoried device with a similarity greater than the similarity threshold (that is, a target inventoried device) is used as the device fingerprint of the target device. In this way, the device fingerprint of the target device is actually obtained by querying the inventoried device fingerprint library created beforehand. The device fingerprints of the inventoried devices included in the inventoried device fingerprint library are obtained by combining various device features of the inventoried devices, and are highly unique. Therefore, the device fingerprint of the target device obtained according to this embodiment is also of high uniqueness.

Further, there may be a plurality of to-be-determined inventoried devices correlated with (or associated with) a device feature group of the target device, as obtained by the querying in step 330. Therefore, there may also be a plurality of to-be-determined inventoried devices (that is, target inventoried devices) with a similarity greater than the similarity threshold. When there are a plurality of to-be-determined inventoried devices with a similarity greater than the similarity threshold, the device fingerprint of a to-be-determined inventoried device with a maximum similarity may be used as the device fingerprint of the target device. Alternatively, the device fingerprints of all to-be-determined inventoried devices with a similarity greater than the similarity threshold may be concatenated to obtain the device fingerprint of the target device. This is not limited herein. In addition, the device fingerprints of the to-be-determined inventoried devices with a similarity greater than the similarity threshold may be concatenated in any manner, and may be concatenated in ascending or descending order of similarity, without being limited herein.

Regardless of whether the device fingerprint of the target device is formed by the device fingerprint of one target inventoried device or by concatenating the device fingerprints of a plurality of target inventoried devices, because the device fingerprints of the inventoried devices are obtained by concatenating the hash values corresponding to a plurality of device feature groups of the target inventoried device, the device fingerprint of the target device specifically includes a plurality of fingerprint information segments. Each segment may represent a different type of device feature. For example, fingerprint information of IP and IMSI of the device may be concatenated. The number of segments included in a device fingerprint varies between different target devices. Therefore, the device fingerprint of each different target device is highly distinguishable, thereby enhancing the uniqueness of the device fingerprint of the target device.

Moreover, the device features included in different device feature groups are not exactly the same. The fingerprint information in different segments included in the device fingerprint of the target device corresponds to different information dimensions, and the different information dimensions are independent of each other, thereby further increasing the distinguishability between the device fingerprints of the target device. Therefore, the device fingerprint of the target device obtained in this embodiment is highly unique and can meet information security requirements in a process of Internet information exchange.

Figure 6:
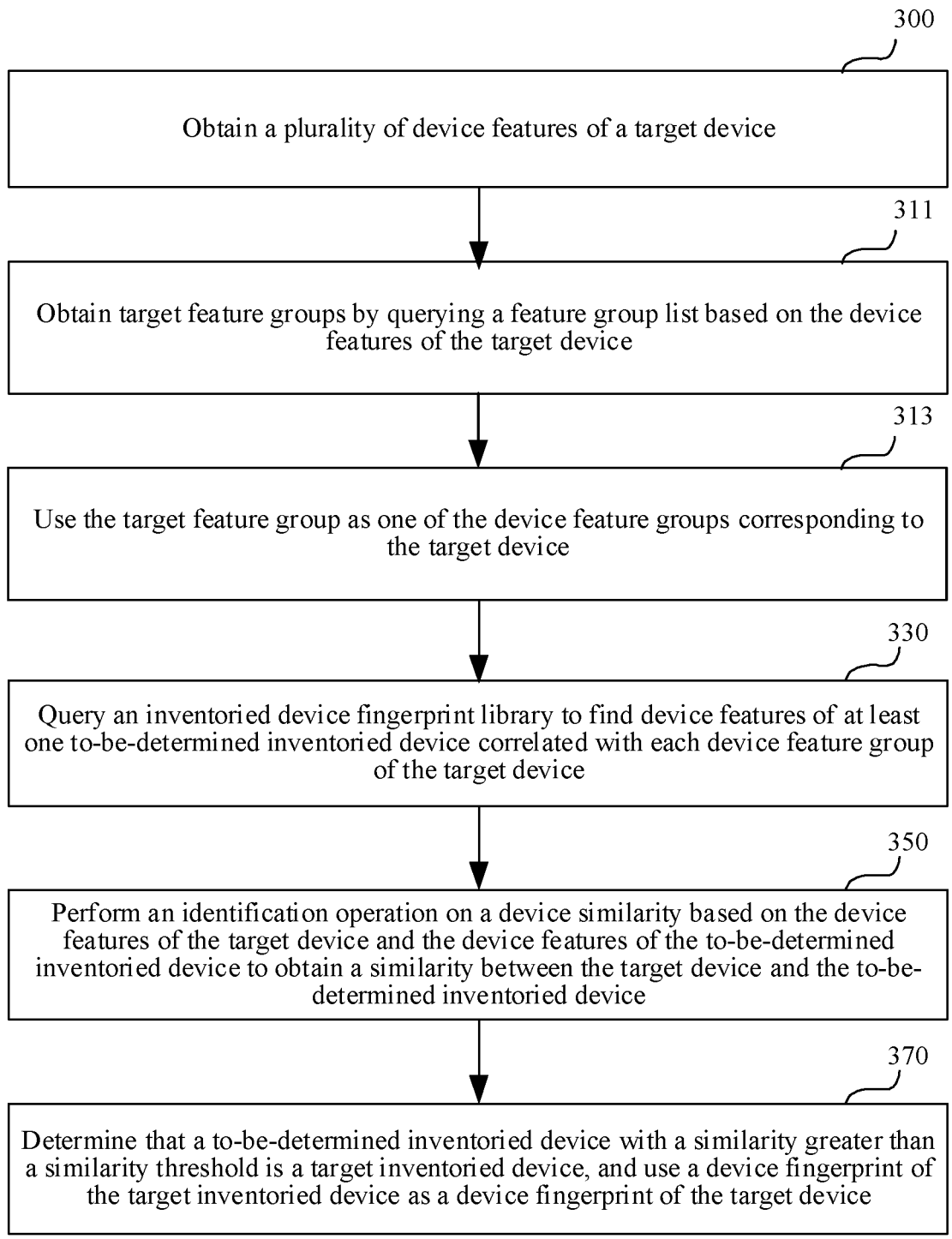
FIG. 6 is a flowchart of a method for generating a device fingerprint according to another exemplary embodiment.

FIG. 6 is a flowchart of a method for generating a device fingerprint according to another exemplary embodiment. In the embodiment shown in FIG. 6, each device feature group corresponding to the target device is specifically obtained by querying a feature group list created beforehand. For other steps of generating the device fingerprint of the target device, refer to the equivalent part of the preceding embodiment. Details are omitted herein.

As shown in FIG. 6, in an exemplary embodiment, in step 310, the determining, based on the plurality of device features, device feature groups corresponding to the target device, may include the following steps:

Step 311: Query a feature group list based on the device features of the target device to find a target feature group. The feature group list includes feature groups obtained by permuting and combining the device features of the inventoried device, and all device features included in the target feature group are the device features of the target device. In other words, the input to the query may include device features of the target device, and the query output may include a feature group that is formed by a combination of the input device features. In another words, the target feature group may be a subset of a set formed by all the device features of the target device. The subset may be smaller or equal to the set.

Step 313: Use the target feature group as one of the device feature groups corresponding to the target device.

As mentioned above, the device features of the target device may be automatically collected by the device feature collecting SDK that runs on the target device, or may be read from a list file stored locally on the target device, or may be obtained by other means, without being limited herein.

The feature group list includes the device feature groups corresponding to a large number of inventoried devices. The device feature groups are device feature groups with a recurrence rate lower than the recurrence rate threshold as a result of filtering several device feature groups obtained by permuting the device features of the inventoried device. Therefore, each device feature group included in the feature group list recurs at a very low recurrence rate. Therefore, each device feature group included in the target device, which is obtained by querying the feature group list in this embodiment, also recurs at a very low recurrence rate.

The target feature group found by querying the feature group list based on the device features of the target device means that all the features in the target feature group are the device features of the target device, and the number of device features of the target device included in the target feature group may be less than or equal to the number of device features of the target device. For example, assuming that the target device includes device features 1, 2, 3, and 4, if, as found in the feature group list, all device features included in a device feature group a are device features 1 and 3, and all device features included in a device feature group b are device features 1, 3, and 4, both the device feature group a and the device feature group b are used as the found target feature groups.

All the features included in the target feature group are the device features of the target device. Therefore, the target feature group used as the device feature group corresponding to the target device is equivalent to the device feature group with a recurrence rate lower than the recurrence rate threshold among the device feature groups obtained by permuting the device features of the target device. In this way, it is ensured that the device fingerprint of the target device generated based on the device feature group is highly unique.

In this embodiment, one or more target feature groups may be obtained by querying the feature group list based on the device features of the target device.

In addition, in other exemplary embodiments, the feature value blacklist library includes several pre-collected device features of low distinguishability. If the device fingerprint is generated based on such device features with low distinguishability, the uniqueness of the device fingerprint will be reduced. Therefore, after step 311, some invalid device features of the target device may be filtered out based on the feature value blacklist library. In this way, in step 313, based on the remaining device features obtained by filtering, the target feature group obtained by querying the feature group list is used as the device feature group corresponding to the target device. In this embodiment, because the device features of low distinguishability are filtered out beforehand, the distinguishability of the device feature group corresponding to the target device is further increased. Therefore, the uniqueness of the consequently generated device fingerprint of the target device is enhanced.

Figure 7:
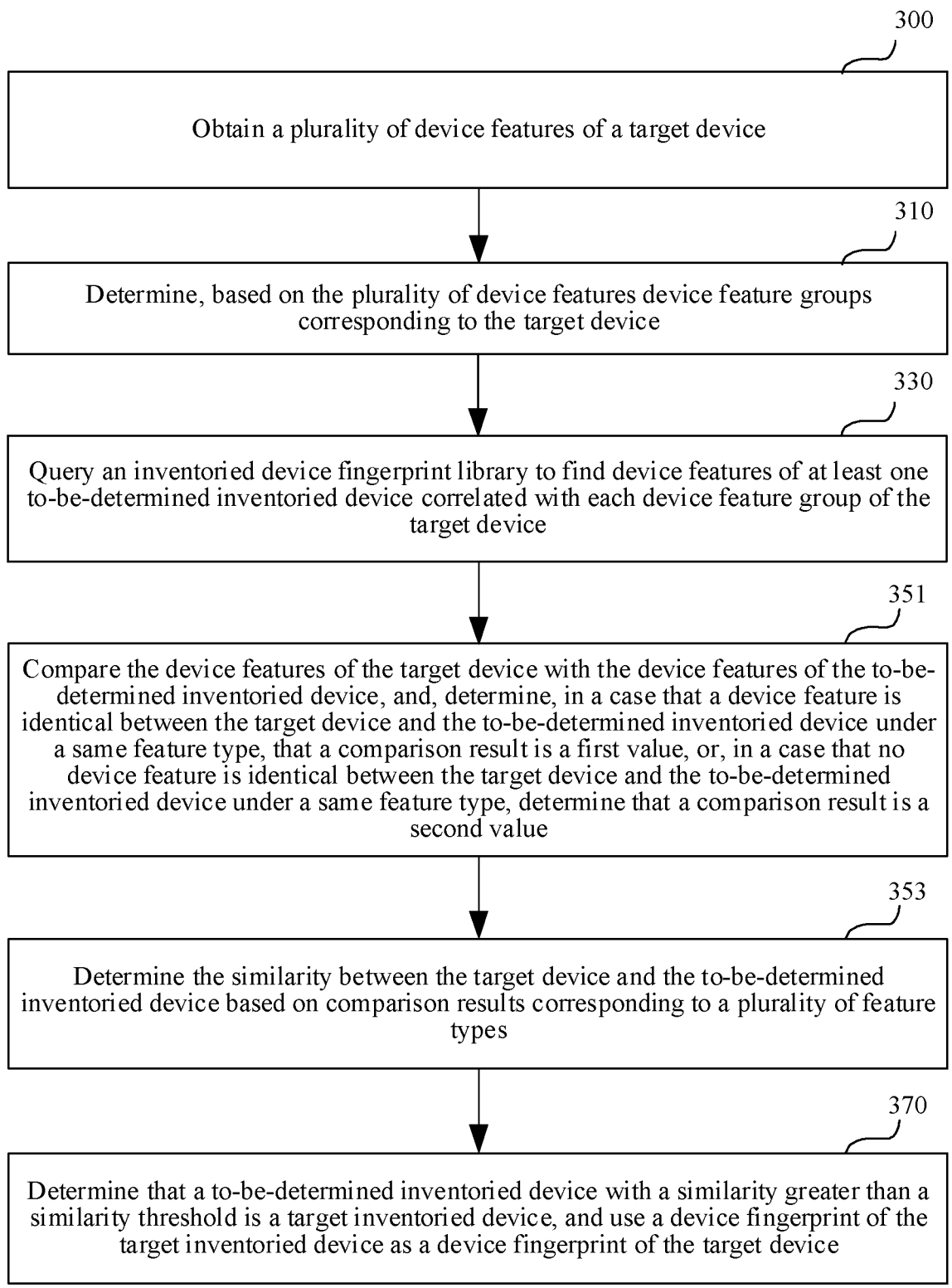
FIG. 7 is a flowchart of a method for generating a device fingerprint according to another exemplary embodiment.

FIG. 7 is a flowchart of a method for generating a device fingerprint according to another exemplary embodiment. In the embodiment shown in FIG. 7, the similarity between the target device and the inventoried device is specifically calculated and measured by equivalent matching.

As shown in FIG. 7, in an exemplary embodiment, in step 350, the performing an identification operation on a device similarity based on the device features of the target device and the device features of the to-be-determined inventoried device to obtain a similarity between the target device and the to-be-determined inventoried device, may include the following steps:

Step 351: Compare the device features of the target device with the device features of the to-be-determined inventoried device, and, determine, in a case that a device feature is identical between the target device and the to-be-determined inventoried device under a same feature type, that a comparison result is a first value, or, in a case that no device feature is identical between the target device and the to-be-determined inventoried device under a same feature type, determine that a comparison result is a second value.

In this embodiment, different device features may be classed into different feature types. For example, the device features may include an IMEI feature type, a CPU ID feature type, an IMSI feature type, and the like. If the device feature is the same between the target device and the inventoried device under the same feature type, it is determined that the similarity between the target device and the inventoried device is a first value; or, if the device feature is not the same, it is determined that the similarity is a second value. For example, the first value may be 1, and correspondingly, the second value is 0. The specific value is not limited herein.

Step 353: Determine the similarity between the target device and the to-be-determined inventoried device based on comparison results corresponding to a plurality of feature types.

In this embodiment, the device features of the target device are compared with the device features of the to-be-determined inventoried device to obtain comparison results corresponding to different feature types. Each comparison result reflects the similarity between the target device and the to-be-determined inventoried device in different device feature dimensions. Therefore, the similarity between the target device and the to-be-determined inventoried device needs to be determined comprehensively based on a sum of the comparison results corresponding to all the feature types, so as to ensure accuracy of the similarity.

In some embodiments, the sum of the comparison results corresponding to all the feature types may be directly used as the similarity between the target device and the to-be-determined inventoried device. If the target device is denoted as $R_1$, the to-be-determined inventoried device is denoted as $R_2$, the similarity between the target device and the to-be-determined inventoried device is denoted as Similarity($R_1$, $R_2$), the device features of the target device and the to-be-determined inventoried device include n feature types in total. Any one of feature types is denoted as i, and a comparison result corresponding to any feature type is denoted as FeatureSimilarity($R_1$, $R_2$)[i], then a formula for calculating the similarity between the target device and the to-be-determined inventoried device is:

$$\text{Similarity}(R_1, R_2) = \sum_{i=1}^{n} \text{FeatureSimilarity}(R_1, R_2)[i].$$

As can be seen from above, based on the device features of the target device and the to-be-determined inventoried device under a plurality of feature types, the similarity between the target device and the to-be-determined inventoried device under each feature type may be identified first, and then, based on a sum of similarities between the target device and the to-be-determined inventoried device under all feature types, an accurate similarity between the target device and the to-be-determined inventoried device can be obtained.

Figure 8:
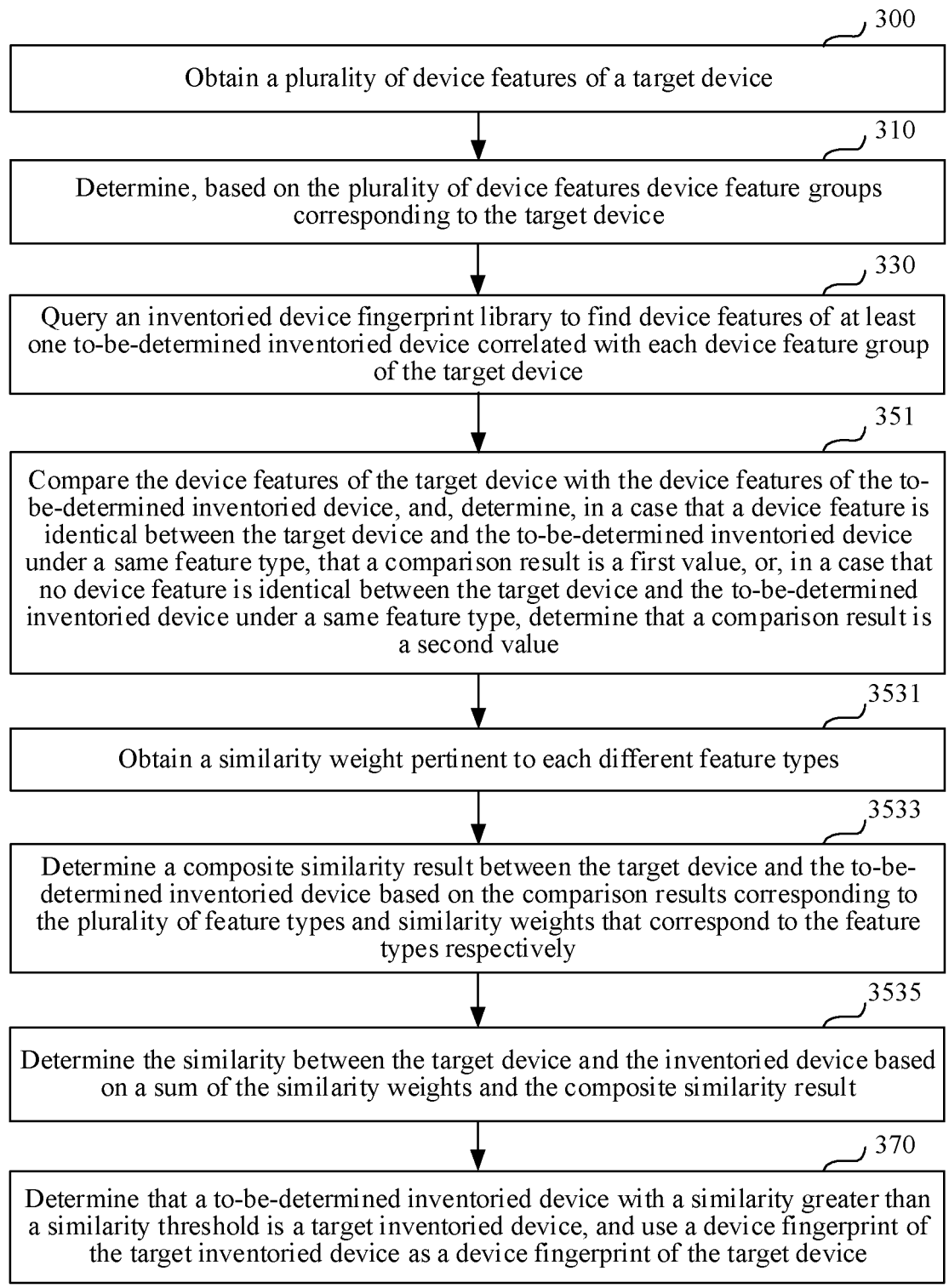
FIG. 8 is a flowchart of a method for generating a device fingerprint according to another exemplary embodiment.

In another embodiment, as shown in FIG. 8, for step 353, the similarity between the target device and the inventoried device may be determined according to the following steps:

Step 3531: Obtain a similarity weight pertinent to each different feature type.

Step 3533: Determine a composite similarity result between the target device and the to-be-determined inventoried device based on the comparison results corresponding to the plurality of feature types and similarity weights that correspond to the feature types respectively.

Step 3535: Determine the similarity between the target device and the inventoried device based on a sum of the similarity weights and the composite similarity result.

The similarity weight pertinent to each feature type may be preset based on the recurrence rate of the device features of each feature type. The higher the recurrence rate, the higher the preset similarity weight. For example, in a process of creating the feature value blacklist library beforehand, a similarity weight may be set for each device feature based on a counted number of times that the device feature of the inventoried device recurs in a device feature sample set. In this way, the similarity weight that is preset for the device feature of each feature type can be obtained correspondingly.

In this embodiment, a formula for calculating the similarity between two devices, such as the target device and the inventoried device, is listed below:

$$\text{Similarity}(R_1, R_2)[i] = \frac{\sum_{i=1}^{n} \text{FeatureSimilarity}(R_1, R_2)[i] \times \text{Weight}[i]}{\sum_{i=1}^{n} \text{Weight}[i]}$$

In the formula, "Weight[i]" is a similarity weight that is preset for the device feature of feature type i (i is a non-negative integer), "$\sum_{i=1}^{n}$ Weight[i]" is a sum of similarity weights corresponding to a plurality of feature types, and "$\sum_{i=1}^{n}$ FeatureSimilarity($R_1$, $R_2$)[i]×Weight[i]" means that the similarity of the device feature of each feature type is multiplied by the corresponding similarity weight to obtain a product and then all products are summed to obtain a composite similarity result equivalent to a sum of comparison results corresponding to a plurality of feature types.

In contrast to the preceding embodiment, in a possible implementation, a weighted sum of identified similarity results corresponding to all the feature types needs to be further calculated based on the device features of the target device and the to-be-determined inventoried device under a plurality of feature types after the similarity between the target device and the to-be-determined inventoried device under each feature type is identified. Then the similarity between the target device and the inventoried device is obtained based on a quotient of dividing the weighted sum of the identified similarity results by a sum of similarity weights of all the feature types.

In this way, in this embodiment, the similarity weight of the device feature is set, so that the similarity between the target device and the to-be-determined inventoried device is optimized based on the recurrence rate of the device feature. Therefore, the similarity between the target device and the to-be-determined inventoried device obtained in this embodiment is more accurate. The device fingerprint of the target inventoried device with a similarity greater than the similarity threshold, which is consequently selected as the device fingerprint of the target device, is also more accurate.

Figure 9:
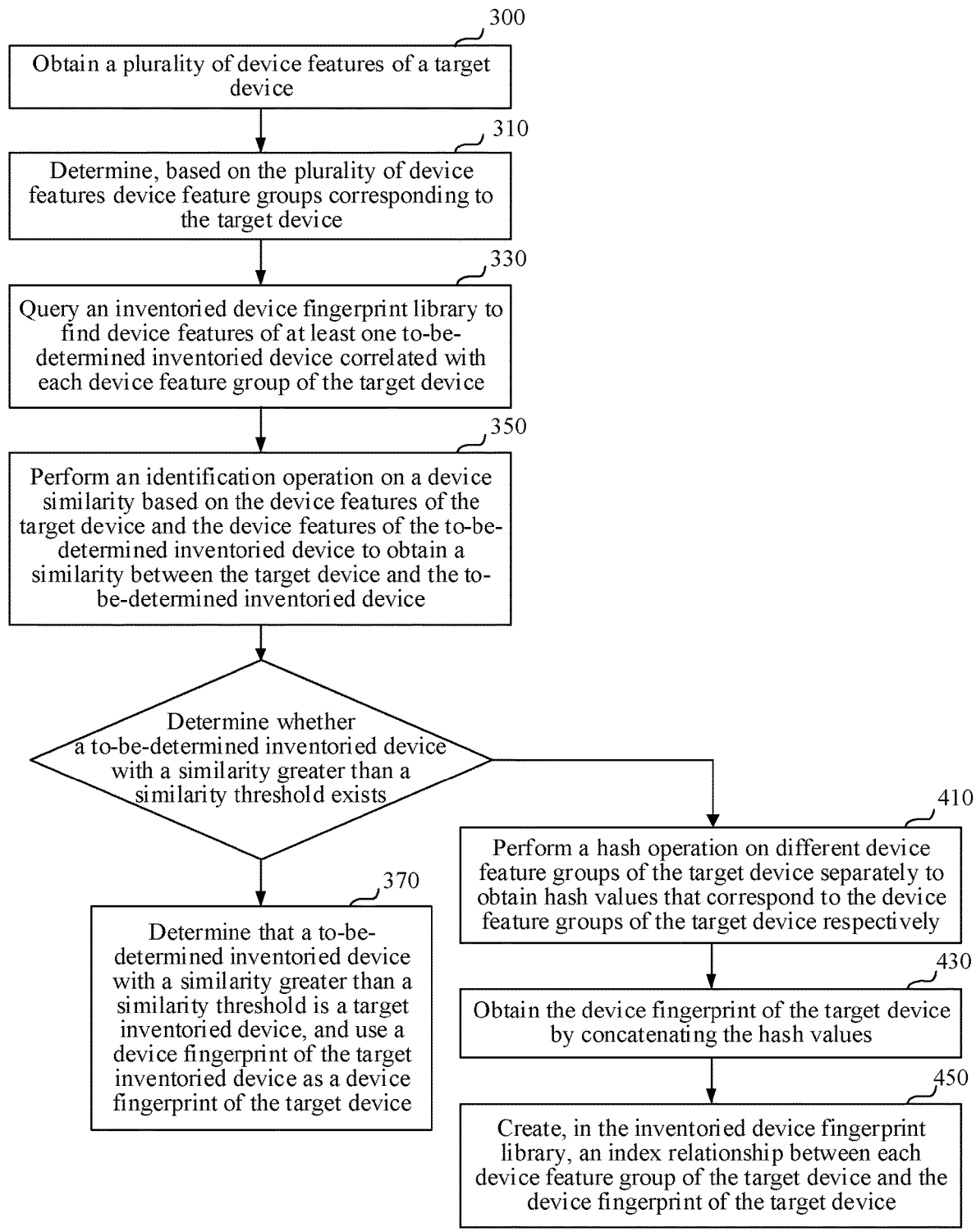
FIG. 9 is a flowchart of a method for generating a device fingerprint according to yet another exemplary embodiment.

FIG. 9 is a flowchart of a method for generating a device fingerprint according to another exemplary embodiment. As shown in FIG. 9, in an exemplary embodiment, after the similarity between the target device and each to-be-determined inventoried device is obtained, if it is determined that no target inventoried device with a similarity greater than the similarity threshold exists in the to-be-determined inventoried devices, then the device fingerprint needs to be generated according to the following steps:

Step 410: Perform a hash operation on different device feature groups of the target device separately to obtain hash values that correspond to the device feature groups of the target device respectively.

In this embodiment, when there is no target inventoried device with a similarity greater than the similarity threshold, it means that the target device is a new device different from all inventoried devices in the inventoried device fingerprint library. In other words, the lookup of the target device from the inventoried device fingerprint library returns null when the target device is new to the library. Therefore, the target device needs to be used as a target inventoried device. The information about the target inventoried device (including the device features and the device fingerprint of the target inventoried device) is added into the inventoried device fingerprint library, thereby updating the inventoried device fingerprint library. When a device fingerprint needs to be generated for the target device next time (or in a subsequent query), the device fingerprint of the target device can be obtained directly by querying the inventoried device fingerprint library.

Each device feature group corresponding to the target inventoried device and the device features of the target inventoried device are known information. Therefore, the inventoried device fingerprint library can be updated by calculating the device fingerprint of the target inventoried device.

In some embodiments, in order to calculate the hash value corresponding to each device feature group of the target inventoried device, the hash value of each device feature included in each device feature group needs to be calculated separately. Consequently, all the calculated hash values are concatenated to obtain the hash value corresponding to each device feature group. In other words, the hash value corresponding to the device feature group of the target device is obtained by concatenating the hash values of all device features included in the device feature group.

In some other embodiments, the feature values of all the device features included in the device feature group may be concatenated first, and then a hash operation is performed on the concatenated feature values to obtain a hash value corresponding to the device feature group. The hash value includes information in an information dimension corresponding to the device feature group. Each different device feature group corresponds to a different hash value.

Further, the method for calculating the hash value pertinent to the device feature group may be the same as the method for calculating, during the creation of the inventoried device fingerprint library, the hash value corresponding to the device feature group of the inventoried device, so as to ensure that all device fingerprints are generated in a unified way. In some specific application scenarios, the device features of the corresponding device can be restored based on the device fingerprint.

Step 430: Obtaining the device fingerprint of the target device by concatenating the hash values.

Similar to what is described in the process of creating an inventoried device fingerprint library, the Hash values corresponding to different device feature groups may be concatenated in an arbitrary way in this embodiment. For example, it is still assumed that the target device includes the device feature group a and the device feature group b, the hash value calculated for the device feature group a is hash value a, and the hash value calculated for the device feature group b is hash value b. The finally obtained device fingerprint of the target device may be concatenated as "hash value a hash value b" or "hash value b hash value a". In both concatenated device fingerprints, a plurality of fingerprint information segments still exist, and each fingerprint information segment corresponds to a different and independent information dimension. Therefore, the device fingerprint is highly unique.

The device fingerprint of the target device is calculated based on each device feature group corresponding to the target device. Therefore, each device feature group corresponding to the target device is correlated with the device fingerprint.

Step 450: Create, in the inventoried device fingerprint library, an index relationship between each device feature group of the target device and the device fingerprint of the target device.

Based on the correlation between each device feature group corresponding to the target device and the corresponding device fingerprint, an index relationship can be created between each device feature group and the information about the target device (including the device features and the device fingerprint of the target device). The index relationship is added into the inventoried device fingerprint library, thereby updating the inventoried device fingerprint library.

When the device fingerprint of the target device is unable to be generated based on the inventoried device fingerprint library, the inventoried device fingerprint library can be updated according to the method provided in this embodiment. The updated inventoried device fingerprint library includes the device fingerprint of the target device. Consequently, when the device fingerprint of the target device needs to be obtained again according to step 300 to step 370, the device fingerprint of the target device can be found in the updated inventoried device fingerprint library.

In some application scenarios, the target device or a client that runs in the target device has been iteratively developed. For example, the target device has updated an operating system, the client on the target device has upgraded services. In this case, the device features of the target device are updated correspondingly. The update of the device features leads to the update of the device feature group corresponding to the target device, so that no inventoried device similar to the target device can be found in the inventoried device fingerprint library. Consequently, the device fingerprint of the target device is unable to be updated.

The method provided in this embodiment solves such a technical problem, and makes the updated device fingerprint include information related to the iterative development. Therefore, along with the iterative development, a new segment can be added to the device fingerprint to ensure that the updated device fingerprint is still highly unique, and ensure security of Internet information exchange.

For ease of understanding the implementation process of the foregoing embodiments, a process of generating a device fingerprint in a specific application scenario is described below.

Figure 10:
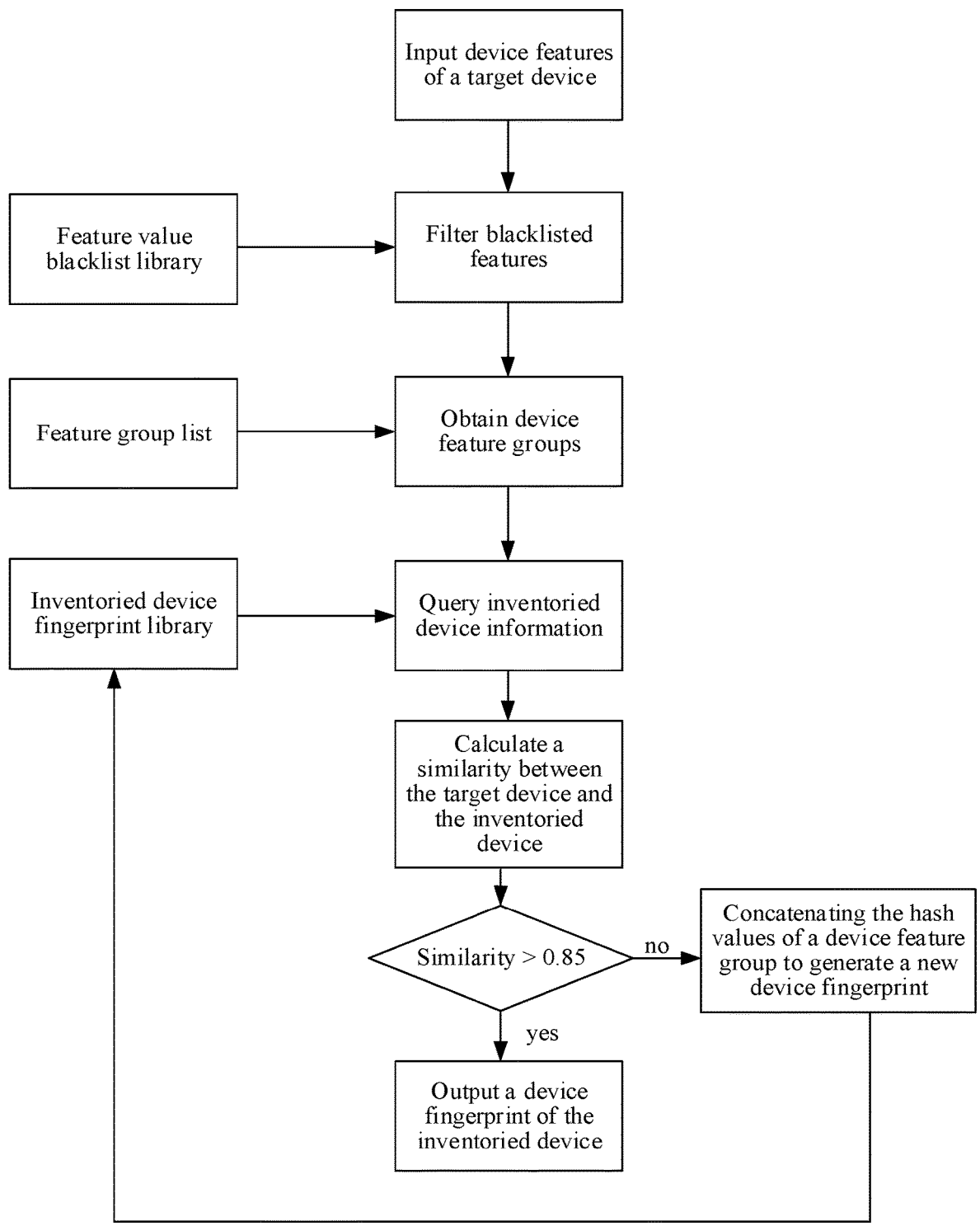
FIG. 10 is a flowchart of generating a device fingerprint in an exemplary application scenario.

FIG. 10 is a flowchart of generating a device fingerprint in an exemplary application scenario. As shown in FIG. 10, a device fingerprint generating process shown in this application scenario may be specifically executed by the localization server 130 in the implementation environment shown in FIG. 1.

As shown in FIG. 10, after a device feature fingerprint of a target device is inputted, blacklisted features (that is, invalid device features) are filtered out through a feature value blacklist library. For the remaining device features, a plurality of device feature groups corresponding to the target device are obtained by querying the feature group list. Based on the plurality of device feature groups of the target device, information about a to-be-determined inventoried device correlated with the plurality of device feature groups is found in an inventoried device fingerprint library. A similarity between the target device and the found to-be-determined inventoried device is calculated. The similarity is used for representing a possibility that the target device is identical to the to-be-determined inventoried device. If the similarity is greater than a similarity threshold, for example, a similarity threshold 0.85, it is directly determined that the to-be-determined inventoried device with a similarity greater than the similarity threshold is a target inventoried device. A device fingerprint of the target inventoried device is used as a device fingerprint of the target device. If the similarity is not greater than the similarity threshold, hash values of all device feature groups of the target device are concatenated. A result of the concatenated hash values is used as the device fingerprint of the target device. An index relationship between each device feature group of the target device, the device feature of the target device, and the device fingerprint of the target device is created in the inventoried device fingerprint library to update the inventoried device fingerprint library. When the device features of the target device need to be obtained next time, the corresponding device fingerprint can be found in the updated inventoried device fingerprint library.

In addition, in another exemplary embodiment, a service system to which the target device belongs may be a closed-loop system. The closed-loop system means that different service systems are independent of each other.

For example, different service systems belong to different service parties, and the services provided by different service parties to a user are independent of each other. Service functions implemented by clients that run on devices that belong to different service systems are also different from each other. In order to ensure security of each service system, each service system needs to be deployed as a closed-loop system.

A third-party system is another service system different from said service systems. In order to ensure security of the third-party system, the third-party system is also a closed-loop system. In some specific application scenarios, a third-party system is required to provide network services for a service system. Therefore, Software-as-a-Service (SAAS), which means a software service provided through a network, needs to be enabled between the service system and the third-party system. However, the service system is independent of the third-party system. Therefore, in order to ensure the security of the network service provided by the third-party system for the service system, the third-party system needs to verify whether a device fingerprint carried in a service request sent by the service system is a device fingerprint of the third-party system. If the carried device fingerprint is the device fingerprint of the third-party system, it means that the service system is reliable, and a network service provided by the third-party system to the service system is also secure.

Therefore, a key point of enabling the SAAS between the service system and the third-party system is how the service system obtains the device fingerprint of the third-party system. The device fingerprint of the third-party system means a device fingerprint of a third-party device included in the third-party system (a device included in the third-party system). When the third-party system includes a plurality of third-party devices, the device fingerprint of any of the third-party devices can be used as the device fingerprint of the third-party system.

In practical applications, a typical SAAS process between the service system and the third-party system is: A service server in the service system responds to a request of a first device in the service system, so as to send a service request to the third-party system. In response to the service request, the third-party system extracts data information related to a second device in the third-party system, and returns the data information to the service system. The first device and the second device are usually the same device.

Figure 11:
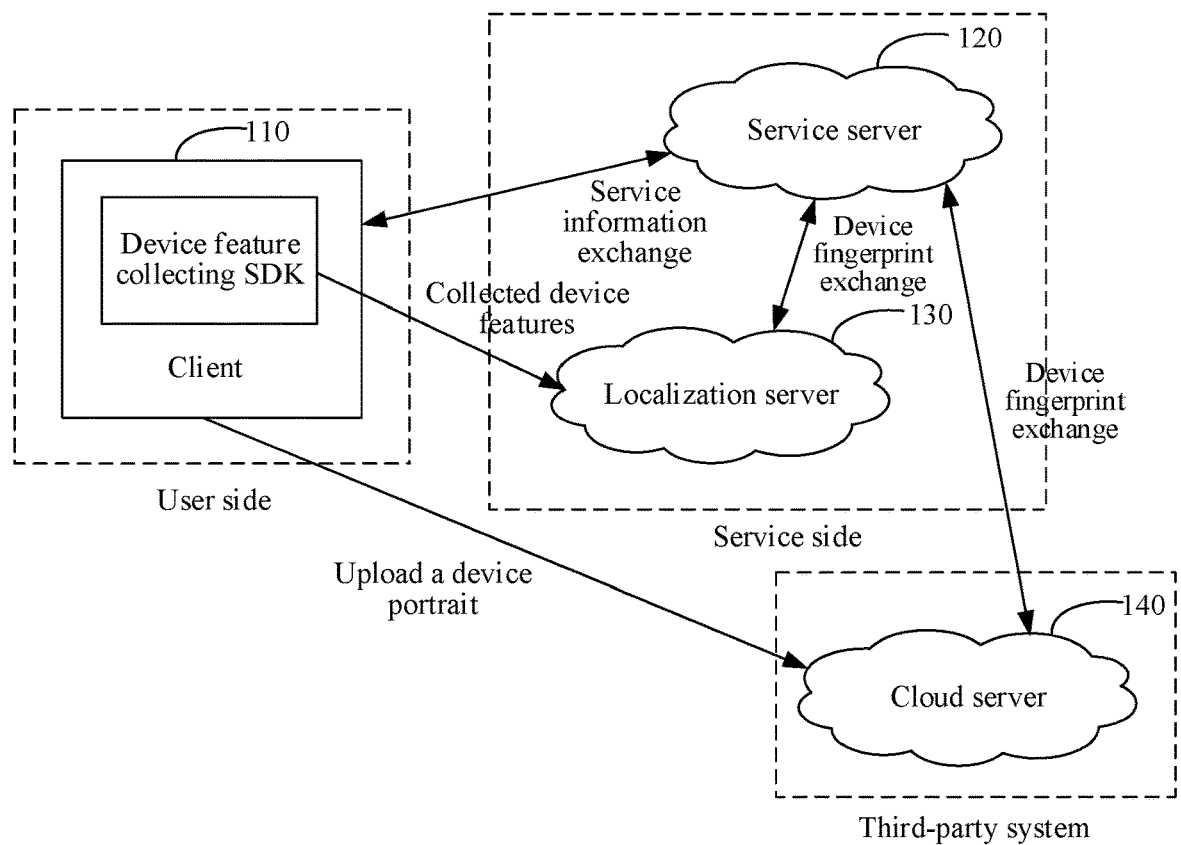
FIG. 11 is a schematic interaction diagram of a service system according to an exemplary embodiment.

For example, in a schematic diagram of exemplary service system interaction shown in FIG. 11, a cloud server 140, serving as a third-party system that is different from a service system formed by a client 110, a business server 120, and a localization server 130, needs to provide a cloud storage service of device portraits for the service system. The client 110 uploads its own device portrait data (such as device features) to the cloud server 140 for storage, so as to reduce consumption of storage space of the device of the client and the service server 120, thereby improving performance of the device of the client and the service server 120. When requesting the device portrait stored in the cloud server 140, the client 110 sends, through the service server 120, a device portrait request to the cloud server. The service portrait request carries a device fingerprint as security verification information. The device fingerprint is generated by the cloud server 140 for a device on which the client 110 resides. The cloud server 140 may be specifically a distributed cloud storage system (the distributed cloud storage system means a storage system that integrates a large number of various storage devices in the network through application software or application interfaces by using functions such as cluster applications, grid technology, and distributed storage file systems, and that works synergistically to provide data storage and service access functions to external devices).

For ease of understanding, the following describes a detailed process by which a service system obtains a device fingerprint of a third-party device in a third-party system, citing FIG. 11 as an example.

First, it needs to be set that both the third-party system and the service system generate a device fingerprint for each device in their respective system according to the method provided in the foregoing embodiment. The third-party system and the service system use the same hash operation method to generate the device fingerprint, for example, use Murmurhash3 as a hash operation method to calculate a hash value of a device feature group, so as to ensure a synchronous way of generating the device fingerprints between the third-party system and the service system. Because the devices included in different systems vary, the inventoried device fingerprint library, feature group list, and feature value blacklist library created in each system also vary between the systems. Therefore, the device fingerprint generated by each different system for the same device varies, thereby ensuring independence between the systems.

However, because the way of generating the device fingerprint is synchronous between the third-party system and the service system, the service system can query the third-party system based on each device feature group corresponding to the device of the service system, so as to find the device fingerprint correlated with each device feature group. The found device fingerprint is the device fingerprint generated by the third-party system for the device. Based on the found device fingerprint, the service system can access a network service in the third-party system.

As shown in FIG. 11, the device features collected by a device feature collecting SDK that runs on the client 110 are sent to a localization server 130 and a cloud server 140 separately. The localization server 130 generates a first device fingerprint based on the device features. The cloud server 140 generates a second device fingerprint based on the device features. The inventoried device fingerprint library, feature group list, and feature value blacklist library created by the localization server 130 are different from those created by the cloud server 140. Consequently, specific parameters used in the process of generating the device fingerprint are different, and therefore, the first device fingerprint is different from the second device fingerprint. However, because the second device fingerprint is still generated based on a plurality of device feature groups that are formed by the device features collected by the device feature collecting SDK, the service server 120 can find the second device fingerprint in the cloud server 140 based on each device feature group corresponding to the device on which the client 110 resides. Based on the found second device fingerprint, the device portrait data required by the client 110 can be obtained from the cloud server 140.

In other embodiments, if the client 110 further needs to obtain, from the cloud server 140, device portraits of other devices (hereinafter referred to as third-party devices) other than the device on which the client 110 resides, it is necessary to obtain the device fingerprint generated by the cloud server 140 for the third-party device.

To solve this problem, in this embodiment, a third-party device feature collecting SDK is introduced into the client 110 to obtain the device features of the third-party device. The device features of the third-party device are sent to the localization server 130. Correspondingly, the localization server 130 generates a device fingerprint of the third-party device based on the device features of the third-party device. Consequently, the device fingerprint generated by the localization server 130 based on the device features of the client 110 is concatenated to the device fingerprint of the third-party device. The concatenated device fingerprint is used as an adjusted device fingerprint of the device on which the client 110 resides. After finding the device fingerprint corresponding to the client 110 in the localization server 130, the service server 120 extracts corresponding segment information in the device fingerprint to obtain the device fingerprint of the third-party device. Device portrait data of the third-party device can be obtained from the cloud server 140 based on the device fingerprint of the third-party device. Therefore, the device fingerprint of the third-party device is used as an additional information segment added into the device fingerprint generated by the localization server 130, so as to support interaction between the service system and the third-party system.

In addition, in another application scenario, the service system and the third-party system each include an inventoried device fingerprint library, and the two inventoried device fingerprint libraries are created by using the same algorithm. Therefore, if the service system loses the inventoried device fingerprint library, the device fingerprint in the service system can be restored by using the inventoried device fingerprint library in the third-party system based on an algorithm used for creating the inventoried device fingerprint library, so as to obtain the original information corresponding to the device fingerprint, such as device features and device feature groups.

As can be seen from what is described in the foregoing embodiments, the method for generating a device fingerprint according to the embodiments of this disclosure achieves at least the following advantages:

First, the device fingerprint generated according to this application can be divided into a plurality of fingerprint information segments. Each segment represents an information dimension (or information space, information scope), and corresponds to one of the device feature groups. Different fingerprint information segments are independent of each other. The number of segments included in a device fingerprint varies between devices. Therefore, the device fingerprint is highly unique, and can meet security requirements of Internet information exchange.

Second, with iterative development of the device, a new segment can be added into the device fingerprint generated according to this application. Therefore, the device fingerprint is scalable with a plurality of segments, and is more scalable and compatible, thereby breaking through a length limit of a conventional device fingerprint with a fixed-length string, and being adaptable to iterative development, device platform upgrades, and the like. The size of the device fingerprint may be based on, for example, the operating system, the software version therein, the hardware platform, and the like.

Third, based on the device fingerprint generated according to this application, a closed-loop service system can be expanded to support interoperability with a third-party system to implement private deployment and SAAS interworking between the service system and the third-party system, thereby facilitating information assimilation and sharing between the service system and the third-party system, and enabling a multi-party independent system to jointly create cross-domain device portraits and device risk control libraries, and adapt to other scenarios.

Fourth, the solution to generating a device fingerprint according to this application supports callback of original device information from the multi-segment fingerprint information included in the device fingerprint. To be specific, the original device information such as the corresponding device feature group and device features can be restored from the multi-segment fingerprint information in the device fingerprint based on an algorithm used for generating the device fingerprint.

Figure 12:
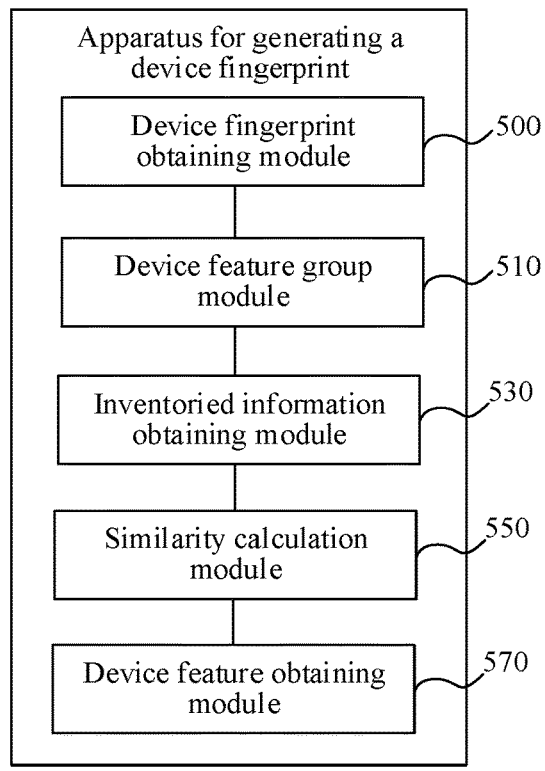
FIG. 12 is a block diagram of an apparatus for generating a device fingerprint according to an exemplary embodiment.

FIG. 12 is a block diagram of an apparatus for generating a device fingerprint according to an exemplary embodiment. The apparatus is applicable to the implementation environment shown in FIG. 1, and may be specifically configured in the localization server 130 shown in the drawing. Alternatively, the apparatus may be configured in the localization server 130 and the cloud server 140 shown in FIG. 10.

In this disclosure, a unit and a module may be hardware such as a combination of electronic circuitries; firmware; or software such as computer instructions. The unit and the module may also be any combination of hardware, firmware, and software. In some implementations, a unit may include at least one module. As shown in FIG. 12, in an exemplary embodiment, the apparatus includes a device feature obtaining module 500, a device feature group module 510, an inventory information obtaining module 530, a similarity calculation module 550, and a device fingerprint obtaining module 570.

The device feature obtaining module 500 is configured to obtain a plurality of device features of a target device. The device feature group module 510 is configured to determine, based on the plurality of device features, device feature groups corresponding to the target device. The inventory information obtaining module 530 is configured to query an inventoried device fingerprint library to find device features of at least one to-be-determined inventoried device correlated with each device feature group of the target device. The similarity calculation module 550 is configured to perform an identification operation on a device similarity based on the device features of the target device and the device features of the to-be-determined inventoried device to obtain a similarity between the target device and the to-be-determined inventoried device. The device fingerprint obtaining module 570 is configured to determine that a to-be-determined inventoried device with a similarity greater than a similarity threshold is a target inventoried device, and use a device fingerprint of the target inventoried device as a device fingerprint of the target device.

In another exemplary embodiment, the device feature group module 510 includes a target feature group querying unit and a device feature group obtaining unit.

The target feature group querying unit is configured to query a feature group list based on the device features of the target device to find a target feature group. The feature group list includes feature groups obtained by permuting and combining the device features of the inventoried device, and all device features included in the target feature group are the device features of the target device. The device feature group obtaining unit is configured to use the target feature group as the device feature group corresponding to the target device.

In another exemplary embodiment, the apparatus further includes a feature value filtering module, configured to filter the device features of the target device based on a feature value blacklist library to filter out a device feature included in the feature value blacklist library among the device features of the target device. The feature value blacklist library includes a device feature with a distinguishability lower than a threshold.

In another exemplary embodiment, the device features fall in different feature types, and the similarity calculation module 550 includes a feature comparison unit and a similarity determining unit.

The feature comparison unit is configured to compare the device features of the target device with the device features of the to-be-determined inventoried device, and, determine, in a case that a device feature is identical between the target device and the to-be-determined inventoried device under a same feature type, that a comparison result is a first value, or, in a case that no device feature is identical between the target device and the to-be-determined inventoried device under a same feature type, determine that a comparison result is a second value. The similarity determining unit is configured to determine the similarity between the target device and the to-be-determined inventoried device based on comparison results corresponding to a plurality of feature types.

In another exemplary embodiment, the similarity determining unit includes a weight obtaining subunit, a weighted sum calculation subunit, and a weight quotient calculation subunit.

The weight obtaining subunit is configured to obtain a similarity weight pertinent to each different feature type. The weighted sum calculation subunit is configured to determine a composite similarity result between the target device and the to-be-determined inventoried device based on the comparison results corresponding to the plurality of feature types and similarity weights that correspond to the feature types respectively. The weight quotient calculation subunit is configured to determine the similarity between the target device and the to-be-determined inventoried device based on a sum of the similarity weights and the composite similarity result.

In another exemplary embodiment, the apparatus further includes a hash operation module, a hash concatenation module and an index creation module.

The hash operation module is configured to perform a hash operation on different device feature groups of the target device separately in a case that no target inventoried device with a similarity greater than the similarity threshold exists in the at least one to-be-determined inventoried device, so as to obtain hash values that correspond to the device feature groups of the target device respectively. The hash concatenation module is configured to obtain the device fingerprint of the target device by concatenating the hash values. The index creation module is configured to create, in the inventoried device fingerprint library, an index relationship between each device feature group of the target device and the device fingerprint of the target device.

In another exemplary embodiment, the apparatus further includes a third-party device feature obtaining module, a third-party fingerprint obtaining module, and a device fingerprint adjustment module.

The third-party device feature obtaining module is configured to obtain device features of a third-party device. The third-party fingerprint obtaining module is configured to generate a device fingerprint of the third-party device based on the device features of the third-party device. The device fingerprint adjustment module is configured to concatenate the device fingerprint of the third-party device and the device fingerprint of the target device, and use the concatenated device fingerprint as an adjusted device fingerprint of the target device.

In another exemplary embodiment, the apparatus further includes a module for creating an inventoried device fingerprint library. The module for creating an inventoried device fingerprint library is configured to obtain the device features corresponding to each inventoried device, and then permute and combine the device features corresponding to each inventoried device to obtain device feature groups of the inventoried device, and finally, calculate a device fingerprint of the inventoried device based on the device feature groups of the inventoried device, and create an inventoried device fingerprint library.

In another exemplary embodiment, the module for creating an inventoried device fingerprint library includes a device fingerprint calculation unit. The device fingerprint calculation unit is configured to determine a recurrence rate of a device feature group of the inventoried device that recurs in the device feature groups of all the inventoried devices, and calculate the device fingerprint of the inventoried device based on a device feature group that recurs at a recurrence rate lower than a recurrence rate threshold in the inventoried device.

In another exemplary embodiment, the apparatus further includes a feature group list creation module. The feature group list creation module is configured to add, into the feature group list, the device feature group that recurs at a recurrence rate lower than the recurrence rate threshold, so that the feature group list includes all device features included in the device feature group of the inventoried device.

In another exemplary embodiment, the module for creating an inventoried device fingerprint library includes a real device filtering unit. The real device filtering unit is configured to obtain a pre-collected device feature sample set, and obtain device features of a real device by filtering the device feature sample set, so that the device features of the real device are used as the device features of the inventoried device.

In another exemplary embodiment, the apparatus further includes a module for creating a feature value blacklist library, configured to determine a number of times that each device feature of the inventoried device recurs in the device feature sample set, and create a feature value blacklist library based on device features that recur for a number of times greater than a count threshold.

The apparatus provided in the foregoing embodiment and the method provided in the preceding embodiment are based on the same concept. The specific manners of performing operations by each module and unit of the apparatus have been described in detail in the method embodiment, and are omitted here.

Figure 13:
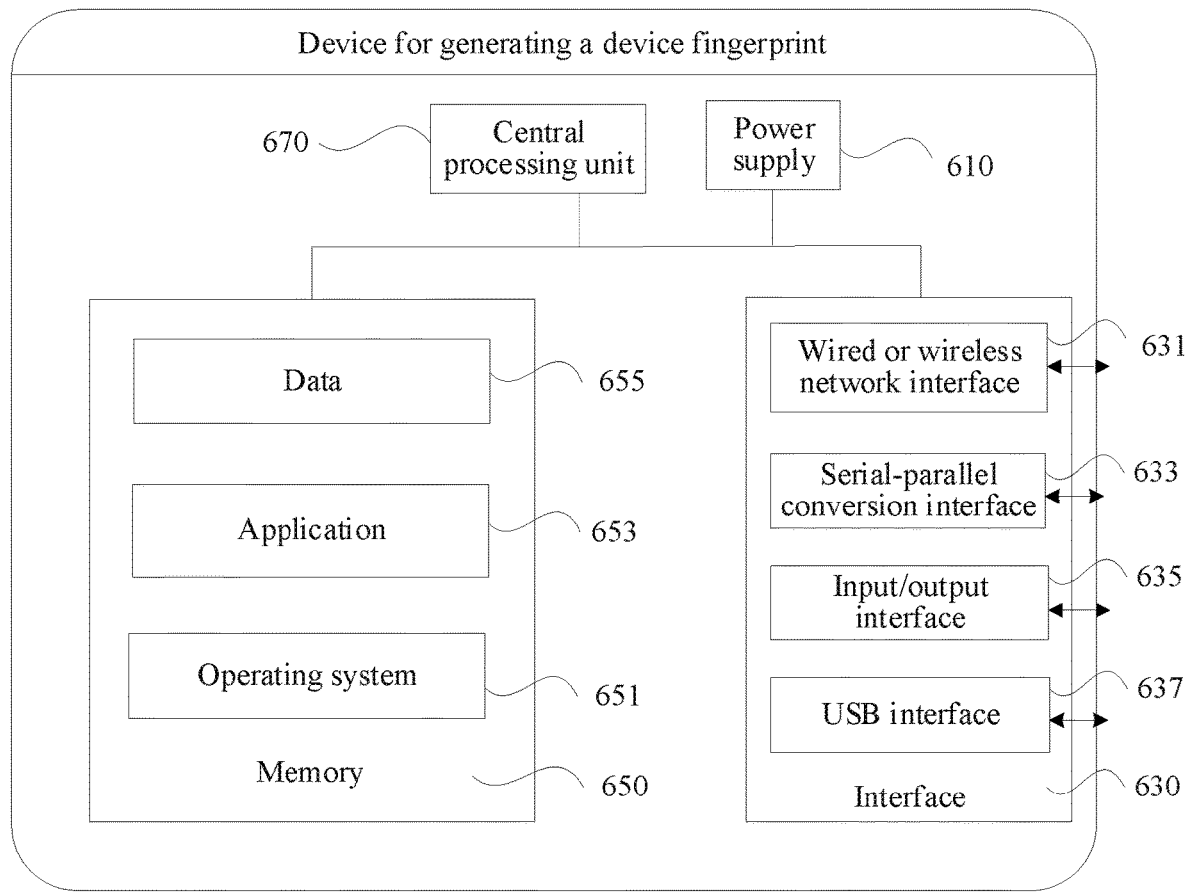
FIG. 13 is a schematic diagram of a hardware structure of a device for generating a device fingerprint according to an exemplary embodiment.

FIG. 13 is a schematic structural diagram of a device for generating a device fingerprint according to an exemplary embodiment.

The device for generating a device fingerprint is just an example adapted to this application, and does not constitute any limitation on the protection scope of this application. It is in no way deemed that the device for generating a device fingerprint depends on or necessarily includes one or more components of the exemplary device for generating a device fingerprint shown in FIG. 13.

The hardware structure of the device may vary greatly depending on configurations or performance. As shown in FIG. 13, the device includes: a power supply 610, an interface 630, at least one memory 650, and at least one central processing unit (CPU) 670.

The power supply 610 is configured to provide working voltage for each hardware device on the device.

The interface 630 includes at least one wired or wireless network interface 631, at least one serial-parallel conversion interface 633, at least one input/output interface 635, and at least one USB interface 637, and the like for communicating with external devices.

The memory 650, serving as a carrier for resource storage, may be a read-only memory, a random access memory, a magnetic disk, an optical disk, or the like. The resources stored on the memory include an operating system 651, an application 653, data 655, or the like, and may be stored transitorily or permanently. The operating system 651 is configured to manage and control various hardware devices and application 653 on the device, so as to enable the central processing unit 670 to calculate and process massive data 655. Examples of the operating system are Windows Server™, Mac OS X™, Unix™, Linux™, and the like. The application 653 is a computer program intended for performing at least one specific task based on the operating system 651, and may include at least one module. Each module may include a series of computer-readable instructions intended for the device.

The central processing unit 670 may include one or more processors, and is configured to communicate with the memory 650 through a bus, and operate and process the mass data 655 in the memory 650.

As described in detail above, a sampling device applicable to this application uses the central processing unit 670 to read a series of computer-readable instructions stored in the memory 650, so as to implement the foregoing method for generating a device fingerprint.

In addition, this application may be implemented by a hardware circuit or by both a hardware circuit and software instructions. Therefore, the implementation of this application is not limited to any specific hardware circuit, software, or combination thereof.

Another aspect of this application further provides a non-transitory computer-readable storage medium on which a computer program is stored. The computer program is used to perform the foregoing method for generating a device fingerprint. The non-transitory computer-readable storage medium may be included in the device for generating a device fingerprint described in the foregoing embodiments, or may be stand-alone without being assembled into the device for generating a device fingerprint.

An embodiment of this application further provides a computer program product that includes an instruction. When the instruction is run on a computer, the computer is caused to perform the method disclosed in the foregoing embodiments.

What is described above is merely exemplary embodiments of this disclosure, and is not intended to limit the embodiments of this disclosure. A person of ordinary skill in the art can easily make equivalent changes or modifications according to the main concept and spirit of this application. Therefore, the protection scope of this application is subject to the protection scope specified in the claims.

What is claimed is:

1. A method for generating a device fingerprint of a target device, executed by a server, the method comprising:
   obtaining a plurality of device features of the target device;
   filtering the device features of the target device based on a blacklist library to filter out a device feature comprised in the blacklist library, wherein the blacklist library is created based on all device features that recur for a number of times greater than a preset count threshold, and wherein the blacklist library comprises to be ignored device features each with a distinguishability lower than a threshold, the to be ignored device features comprising International Mobile Equipment Identity (IMEI) and International Mobile Subscriber Identity (IMSI) associated with a device;
   obtaining, based on the plurality of filtered device features, a target device feature group of the target device by combining different device features of the target device;
   querying an inventoried device fingerprint library to retrieve candidate device features of at least one candidate inventoried device mapped to the target device feature group, the inventoried device fingerprint library comprising a first mapping relationship between a set of feature groups encompassing the target device feature group and a set of inventory devices including the at least one candidate inventoried device, and a second mapping relationship between the set of inventory devices and device features of each of the set of inventoried device, wherein the set of feature groups comprises a first feature group and a second feature group, and wherein a number of features in the first feature group and a number of features in the second feature group are different;
   identifying a device similarity based on the plurality of device features of the target device and the candidate device features of the at least one candidate inventoried device, to obtain a similarity between the target device and the at least one candidate inventoried device; and
   in response to the similarity between the target device and the at least one candidate inventoried device being greater than a similarity threshold, using a first device fingerprint of the at least one candidate inventoried device as the device fingerprint of the target device; and
   creating, in the inventoried device fingerprint library, an index relationship between each target device feature group of the target device and the device fingerprint of the target device.

2. The method according to claim 1, wherein obtaining, based on the plurality of device features, the target device feature group of the target device comprises:
   querying a feature group list based on the device features of the target device to find a target feature group, the feature group list comprising feature groups obtained by permuting and combining the device features of the each inventoried device, and every device features comprised in the target feature group being one of the device features of the target device; and
   using the target feature group as the target device feature group of the target device.

3. The method according to claim 1, wherein the device features are categorized into different feature types, and identifying the device similarity based on the plurality of device features of the target device and the candidate device features of the at least one candidate inventoried device to obtain the similarity between the target device and the at least one candidate inventoried device comprises:
   for each of a plurality of feature types and for device features belonging to the each of the plurality of feature types:
      comparing the device features of the target device with the candidate device features of the at least one candidate inventoried device, and, in response to a device feature being identical between the target device and the at least one candidate inventoried device, determining that a comparison result is a first value, or, in response to no device feature being identical between the target device and the at least one candidate inventoried device under a same feature type, determining that a comparison result is a second value; and
   determining the similarity between the target device and the at least one candidate inventoried device based on comparison results corresponding to the plurality of feature types.

4. The method according to claim 3, wherein determining the similarity between the target device and the at least one candidate inventoried device based on the comparison results corresponding to the plurality of feature types comprises:
   obtaining a similarity weight pertinent to each different feature type;
   determining a composite similarity result between the target device and the at least one candidate inventoried device based on the comparison results corresponding to the plurality of feature types and similarity weights respectively corresponding to the feature types; and
   determining the similarity between the target device and the at least one candidate inventoried device based on a sum of the similarity weights and the composite similarity result.

5. The method according to claim 1, further comprising:
   in response to the similarity between the target device and the at least one candidate inventoried device not being greater than the similarity threshold, performing a hash operation on different target device feature groups of the target device separately, to obtain hash values that respectively correspond to the target device feature groups of the target device;
   obtaining the device fingerprint of the target device by concatenating the hash values.

6. The method according to claim 1, further comprising:
   obtaining device features of a third-party device;
   generating a device fingerprint of the third-party device based on the device features of the third-party device; and
   concatenating the device fingerprint of the third-party device and the device fingerprint of the target device, and using the concatenated device fingerprint as an adjusted device fingerprint of the target device.

7. The method according to claim 1, further comprising:
   obtaining the device features of each inventoried device;
   permuting and combining the device features of the each inventoried device to obtain device feature groups of the each inventoried device; and
   calculating the device fingerprint of the each inventoried device based on the device feature groups of the each inventoried device, to create the inventoried device fingerprint library.

8. The method according to claim 7, wherein calculating the device fingerprint of the each inventoried device based on the device feature groups of the each inventoried device comprises:
- determining a recurrence rate of each device feature group of the each inventoried device recurring in device feature groups of all inventoried devices; and
- calculating the device fingerprint of the each inventoried device based on a device feature group that recurs at a recurrence rate lower than a recurrence rate threshold.

9. The method according to claim 8, the method further comprising:
- in response to the recurrence rate of the each device feature group of the each inventoried device being lower than the recurrence rate threshold, adding, into a feature group list, the each device feature group of the each inventoried device, so that the feature group list comprises all device features comprised in the each device feature group of the each inventoried device.

10. The method according to claim 7, wherein, before obtaining the device features of the each inventoried device, the method further comprises:
- obtaining a pre-collected device feature sample set; and
- obtaining device features of a real device by filtering the device feature sample set, so that the device features of the real device are used as the device features of the each inventoried device.

11. The method according to claim 10, further comprising:
- determining a number of times that each device feature of the each inventoried device recurs in the device feature sample set; and
- creating a blacklist library based on device features that recur for a number of times greater than a threshold.

12. A device for generating a device fingerprint of a target device, the device comprising a memory for storing computer instructions and a processor in communication with the memory, wherein, when the processor executes the computer instructions, the processor is configured to cause the device to:
- obtain a plurality of device features of the target device;
- filter the device features of the target device based on a blacklist library to filter out a device feature comprised in the blacklist library, wherein the blacklist library is created based on all device features that recur for a number of times greater than a preset count threshold, and wherein the blacklist library comprises to be ignored device features each with a distinguishability lower than a threshold, the to be ignored device features comprising International Mobile Equipment Identity (IMEI) and International Mobile Subscriber Identity (IMSI) associated with a device;
- obtain, based on the plurality of filtered device features, a target device feature group of the target device by combining different device features of the target device;
- query an inventoried device fingerprint library to retrieve candidate device features of at least one candidate inventoried device mapped to the target device feature group, the inventoried device fingerprint library comprising a first mapping relationship between a set of feature groups encompassing the target device feature group and a set of inventory devices including the at least one candidate inventoried device, and a second mapping relationship between the set of inventory devices and device features of each of the set of inventoried device, wherein the set of feature groups comprises a first feature group and a second feature group, and wherein a number of features in the first feature group and a number of features in the second feature group are different;
- identify a device similarity based on the plurality of device features of the target device and the candidate device features of the at least one candidate inventoried device, to obtain a similarity between the target device and the at least one candidate inventoried device; and
- in response to the similarity between the target device and the at least one candidate inventoried device being greater than a similarity threshold, use a first device fingerprint of the at least one candidate inventoried device as the device fingerprint of the target device; and
- create, in the inventoried device fingerprint library, an index relationship between each target device feature group of the device and the device fingerprint of the target device.

13. The device according to claim 12, wherein, when the processor is configured to cause the device to obtain, based on the plurality of device features, the target device feature group of the target device, the processor is configured to cause the device to:
- query a feature group list based on the device features of the target device to find a target feature group, the feature group list comprising feature groups obtained by permuting and combining the device features of the each inventoried device, and every device features comprised in the target feature group being one of the device features of the target device; and
- use the target feature group as the target device feature group of the target device.

14. The device according to claim 12, wherein the device features are categorized into different feature types, and wherein, when the processor is configured to cause the device to identify the device similarity based on the plurality of device features of the target device and the candidate device features of the at least one candidate inventoried device to obtain the similarity between the target device and the at least one candidate inventoried device, the processor is configured to cause the device to:
- for each of a plurality of feature types and for device features belonging to the each of the plurality of feature types:
  - compare the device features of the target device with the candidate device features of the at least one candidate inventoried device, and, in response to a device feature being identical between the target device and the at least one candidate inventoried device, determining that a comparison result is a first value, or, in response to no device feature being identical between the target device and the at least one candidate inventoried device under a same feature type, determining that a comparison result is a second value; and
- determine the similarity between the target device and the at least one candidate inventoried device based on comparison results corresponding to the plurality of feature types.

15. The device according to claim 14, wherein, when the processor is configured to cause the device to determine the similarity between the target device and the at least one candidate inventoried device based on the comparison results corresponding to the plurality of feature types, the processor is configured to cause the device to:
- obtain a similarity weight pertinent to each different feature type;

determine a composite similarity result between the target device and the at least one candidate inventoried device based on the comparison results corresponding to the plurality of feature types and similarity weights respectively corresponding to the feature types; and determine the similarity between the target device and the at least one candidate inventoried device based on a sum of the similarity weights and the composite similarity result.

16. The device according to claim 12, wherein, when the processor executes the computer instructions, the processor is configured to further cause the device to:

in response to the similarity between the target device and the at least one candidate inventoried device not being greater than the similarity threshold, perform a hash operation on different target device feature groups of the target device separately, to obtain hash values that respectively correspond to the target device feature groups of the target device;

obtain the device fingerprint of the target device by concatenating the hash values; and create, in the inventoried device fingerprint library, an index relationship between each target device feature group of the target device and the device fingerprint of the target device.

17. The device according to claim 12, wherein, when the processor executes the computer instructions, the processor is configured to further cause the device to:

obtain device features of a third-party device;

generate a device fingerprint of the third-party device based on the device features of the third-party device; and concatenate the device fingerprint of the third-party device and the device fingerprint of the target device, and use the concatenated device fingerprint as an adjusted device fingerprint of the target device.

18. A non-transitory storage medium for storing computer readable instructions, the computer readable instructions, when executed by a processor, causing the processor to:

obtain a plurality of device features of a target device;

filter the device features of the target device based on a blacklist library to filter out a device feature comprised in the blacklist library, wherein the blacklist library is created based on all device features that recur for a number of times greater than a preset count threshold, and wherein the blacklist library comprises to be ignored device features each with a distinguishability lower than a threshold, the to be ignored device features comprising International Mobile Equipment Identity (IMEI) and International Mobile Subscriber Identity (IMSI) associated with a device;

obtain, based on the plurality of filter device features, a target device feature group of the target device by combining different device features of the target device;

query an inventoried device fingerprint library to retrieve candidate device features of at least one candidate inventoried device mapped to the target device feature group, the inventoried device fingerprint library comprising a first mapping relationship between a set of feature groups encompassing the target device feature group and a set of inventory devices including the at least one candidate inventoried device, and a second mapping relationship between the set of inventory devices and device features of each of the set of inventoried device, wherein the set of feature groups comprises a first feature group and a second feature group, and wherein a number of features in the first feature group and a number of features in the second feature group are different;

identify a device similarity based on the plurality of device features of the target device and the candidate device features of the at least one candidate inventoried device, to obtain a similarity between the target device and the at least one candidate inventoried device; and in response to the similarity between the target device and the at least one candidate inventoried device being greater than a similarity threshold, use a first device fingerprint of the at least one candidate inventoried device as a device fingerprint of the target device; and create, in the inventoried device fingerprint library, an index relationship between each target device feature group of the target device and the device fingerprint of the target device.

* * * * *

UNITED STATES PATENT AND TRADEMARK OFFICE
CERTIFICATE OF CORRECTION

PATENT NO. : 12,355,764 B2  
APPLICATION NO. : 17/846360  
DATED : July 8, 2025  
INVENTOR(S) : Huiyou Hua et al.

Page 1 of 1

It is certified that error appears in the above-identified patent and that said Letters Patent is hereby corrected as shown below:

In the Claims

In Column 25, Claim 1, Line 20, replace "the" with "a".

In Column 27, Claim 12, Line 53, replace "the" with "a".

In Column 30, Claim 18, Line 9, replace "the" with "a" and replace "filter" with "filtered".

Signed and Sealed this  
Ninth Day of December, 2025

John A. Squires  
*Director of the United States Patent and Trademark Office*